United States Patent
Lyske

(10) Patent No.: US 10,467,999 B2
(45) Date of Patent: Nov. 5, 2019

(54) AUDITORY AUGMENTATION SYSTEM AND METHOD OF COMPOSING A MEDIA PRODUCT

(71) Applicant: Time Machine Capital Limited, Warwickshire (GB)

(72) Inventor: Joseph Michael William Lyske, Kent (GB)

(73) Assignee: TIME MACHINE CAPITAL LIMITED, Warwickshire (GB)

( * ) Notice: Subject to any disclaimer, the term of this patent is extended or adjusted under 35 U.S.C. 154(b) by 0 days.

(21) Appl. No.: 16/035,234

(22) Filed: Jul. 13, 2018

(65) Prior Publication Data
US 2018/0322855 A1  Nov. 8, 2018

Related U.S. Application Data

(63) Continuation of application No. 15/189,306, filed on Jun. 22, 2016, now Pat. No. 10,032,441.

(30) Foreign Application Priority Data

Jun. 22, 2015  (GB) .................................. 1510907.7

(51) Int. Cl.
*G10H 1/08* (2006.01)
*G10H 1/40* (2006.01)
(Continued)

(52) U.S. Cl.
CPC .......... *G10H 1/0025* (2013.01); *A63B 69/00* (2013.01); *G06F 16/24575* (2019.01);
(Continued)

(58) Field of Classification Search
CPC .......... G10H 2240/131; G10H 1/0008; G10H 1/0066; G10H 1/40; G10H 2210/375; G10H 2240/056; G10H 2210/381; H04N 5/04
See application file for complete search history.

(56) References Cited

U.S. PATENT DOCUMENTS 6,316,712 B1  11/2001  Laroche
6,476,308 B1  11/2002  Zhang
(Continued)

FOREIGN PATENT DOCUMENTS

EP  1666967  6/2006
EP  2542552  1/2013
(Continued)

OTHER PUBLICATIONS

International Search Report of PCT/GB2016/051862, dated Dec. 13, 2016.
(Continued)

*Primary Examiner* — Marlon T Fletcher
(74) *Attorney, Agent, or Firm* — Beyer Law Group LLP

(57) ABSTRACT

An auditory augmentation system includes a database with a multiplicity of audio sections and associated metadata for digital audio files. Each audio section is mapped to a contextual theme, each contextual theme being mapped to an audio section having an entry point and an exit point. The entry and exit points support seamless splice or fade transitions between different audio sections. A processing system couples to the database along with an input; the input is in the form of temporally-varying events data that defines a temporal input. The processing system resolves the temporal input into one or more of a plurality of categorized contextual themes, correlates the categorized contextual themes with metadata associated with selected audio sections relevant to the one or more categorized contextual themes, and
(Continued)

splices or fades together selected audio sections, and generates, as an output, a media product in which transitions between audio sections are seamless.

18 Claims, 11 Drawing Sheets

(51) Int. Cl.

| | | |
|---|---|---|
| G10H 1/00 | (2006.01) | |
| G06F 16/2457 | (2019.01) | |
| G11B 27/038 | (2006.01) | |
| G11B 27/036 | (2006.01) | |
| G11B 27/28 | (2006.01) | |
| A63B 69/00 | (2006.01) | |
| H04N 21/845 | (2011.01) | |
| G11B 20/10 | (2006.01) | |
| H04H 60/06 | (2008.01) | |
| H04H 60/33 | (2008.01) | |
| H04H 60/65 | (2008.01) | |
| G06F 16/61 | (2019.01) | |
| A63B 71/06 | (2006.01) | |
| G11B 27/00 | (2006.01) | |
| G11B 27/10 | (2006.01) | |
| G10H 1/36 | (2006.01) | |
| G10H 1/057 | (2006.01) | |
| G10H 1/46 | (2006.01) | |
| G10H 7/00 | (2006.01) | |

(52) U.S. Cl.
CPC ......... *G10H 1/40* (2013.01); *G11B 20/10527* (2013.01); *G11B 27/036* (2013.01); *G11B 27/038* (2013.01); *G11B 27/28* (2013.01); *H04H 60/06* (2013.01); *H04H 60/33* (2013.01); *H04H 60/65* (2013.01); *H04N 21/8456* (2013.01); *A63B 71/0686* (2013.01); *G06F 16/61* (2019.01); *G10H 1/057* (2013.01); *G10H 1/361* (2013.01); *G10H 1/46* (2013.01); *G10H 7/008* (2013.01); *G10H 2210/051* (2013.01); *G10H 2210/061* (2013.01); *G10H 2210/076* (2013.01); *G10H 2210/091* (2013.01); *G10H 2210/105* (2013.01); *G10H 2210/125* (2013.01); *G10H 2210/131* (2013.01); *G10H 2210/371* (2013.01); *G10H 2210/375* (2013.01); *G10H 2210/391* (2013.01); *G10H 2220/126* (2013.01); *G10H 2230/015* (2013.01); *G10H 2240/085* (2013.01); *G10H 2240/121* (2013.01); *G10H 2240/131* (2013.01); *G10H 2240/325* (2013.01); *G10H 2250/035* (2013.01); *G11B 27/005* (2013.01); *G11B 27/105* (2013.01); *G11B 2020/1062* (2013.01)

(56) References Cited

U.S. PATENT DOCUMENTS

| | | | |
|---|---|---|---|
| 7,518,053 B1 | 4/2009 | Jochelson et al. | |
| 8,280,539 B2 | 10/2012 | Jehan | |
| 8,426,715 B2 | 4/2013 | Bregar | |
| 8,907,197 B2 | 12/2014 | Okuda | |
| 10,032,441 B2 | 7/2018 | Lyske | |
| 2002/0007722 A1 | 1/2002 | Aoki et al. | |
| 2002/0134219 A1 | 9/2002 | Aoki | |
| 2002/0155416 A1 | 10/2002 | Barton | |
| 2002/0180774 A1* | 12/2002 | Errico | G11B 27/005 715/721 |
| 2003/0037664 A1 | 2/2003 | Comair et al. | |
| 2004/0197088 A1* | 10/2004 | Ferman | G06F 3/0481 386/251 |
| 2005/0047614 A1 | 3/2005 | Herberger et al. | |
| 2006/0272485 A1 | 12/2006 | Lengeling et al. | |
| 2007/0074617 A1 | 4/2007 | Vergo | |
| 2007/0074618 A1 | 4/2007 | Vergo | |
| 2007/0074619 A1 | 4/2007 | Vergo | |
| 2007/0261537 A1 | 11/2007 | Eronen | |
| 2007/0291958 A1 | 12/2007 | Jehan | |
| 2008/0030462 A1* | 2/2008 | Lasar | G06Q 10/10 345/156 |
| 2008/0249644 A1 | 10/2008 | Jehan | |
| 2009/0003802 A1 | 1/2009 | Takai et al. | |
| 2009/0024234 A1 | 1/2009 | Archibald | |
| 2009/0049979 A1 | 2/2009 | Naik | |
| 2009/0272253 A1 | 11/2009 | Yamashita et al. | |
| 2011/0054648 A1 | 3/2011 | Maxwell et al. | |
| 2012/0118127 A1 | 5/2012 | Miyajima | |
| 2014/0076124 A1 | 3/2014 | Kellett et al. | |
| 2014/0076125 A1* | 3/2014 | Kellett | G10H 7/00 84/609 |
| 2014/0288686 A1 | 9/2014 | Sant | |
| 2015/0018993 A1 | 1/2015 | Trivedi | |
| 2016/0179946 A1 | 6/2016 | Stadler et al. | |
| 2016/0240179 A1 | 8/2016 | Uemura et al. | |
| 2016/0249093 A1 | 8/2016 | Stojancic et al. | |
| 2016/0372095 A1* | 12/2016 | Lyske | G10H 1/40 |
| 2016/0372096 A1* | 12/2016 | Lyske | G10H 1/40 |
| 2017/0024615 A1 | 1/2017 | Allen et al. | |
| 2018/0192108 A1* | 7/2018 | Lyons | G06F 17/30828 |
| 2019/0164527 A1 | 5/2019 | Lyske | |

FOREIGN PATENT DOCUMENTS

| | | |
|---|---|---|
| WO | 2004/081940 | 9/2004 |
| WO | 2015/053278 | 4/2015 |

OTHER PUBLICATIONS

International Written Opinion of PCT/GB2016/051862, dated Dec. 13, 2016.
Rouhua Zhou et al. Music Onset Detection Based on Resonator Time Frequency Image, New York, NY, USA, Nov. 1, 2008.
Gainza Mikel Automatic Bar Line Segmentation, Convention Paper, AES, 123$^{rd}$ Convention, Dubin Institute of Technology, Oct. 5, 2007.
O'Keeffe Dancing Monkeys, Feb. 18, 2014.
Florent Berthaut et al. Advanced Sychronization of Audio or Symbolic Musical Patterns, Sep. 19, 2012.
GB Combined Search and Examination Report dated Dec. 22, 2015 from GB Application No. 1510907.7.
Combined Search and Examination Report dated Feb. 26, 2019.
Blackboard system and top-down processing for the transcription of simple polyphonic music, Bello, J.P., 2000.
Non-negative matrix factorization for polyphonic music transcription Smaragdis, P., 2003.
Complex Domain Onset Detection for Musical Signals, Duxbury, C, 2003.
Onset Detection Using Comb Filters Gainza, M., B. Lawlor and E. Coyle, 2005.
Musical key extraction from audio, Pauws, S, 2004.
Detection of Key Change in Classical Piano Music, Chai, W. And B. Vercoe, 2005.
Tempo and Beat Analysis of Acoustic Musical Signals, Scheirer, E, 1998, p. 588-601.
Causal Tempo Tracking of Audio, Davies, 2004.
Time Signature Detection by Using a Multi-Resolution Audio Similarity Matrix, Gainza, M. And E. Coyle, 2007.
Automatic Bar Line Segmentation, Mikel Gainza, Dan Barry, Eugene Coyle, 2007.
ISMIR 2004, 5$^{th}$ International Conference on Music Information Retrieval, Oct. 10-14, 2004.

* cited by examiner

| Database | | | | | | |
|---|---|---|---|---|---|---|
| Track | Section | Description | Time Position | Entry Pt | | Exit Pt |
| 1 | 001 | Chorus | 0.15 - 0.36 | | ▨ | |
| 1 | 010 | VERSE | 0.36 - 0.59 | | | |
| 1 | 011 | Intro | 0.00 - 0.15 | | | |
| 2 | 001 | Chorus | 1.05 - 1.20 | | | |
| 2 | 010 | VERSE | 1.30 - 1.48 | | | |
| 2 | 011 | Intro | 0.00 - 0.10 | | | |
| 2 | 001 | Chorus | 2.05 - 2.20 | | | |
| 2 | 011 | xxx | 3.19 - 3.49 | | | |
| 2 | 101 | OUTROW | 4.06 - 4.21 | | | ▨ ▨ |
| N | | Theme categorg 204 | Section Timing | Exit/Entry points Anacrusis Displacement (Beat + Fraction) relative to start/end of audio section | | |

FIG. 10

AUDITORY AUGMENTATION SYSTEM AND METHOD OF COMPOSING A MEDIA PRODUCT

CROSS-REFERENCE TO RELATED APPLICATIONS

This Application claims priority to GB Application No. 1510907.7, filed on Jun. 22, 2015, which is incorporated herein in its entirety for all purposes.

This application is a continuation of U.S. patent application Ser. No. 15/189,306 filed Jun. 22, 2016, entitled "MUSIC CONTEXT SYSTEM, AUDIO TRACK STRUCTURE AND METHOD OF REAL-TIME SYNCHRONIZATION OF MUSICAL CONTENT," which is hereby incorporated by reference.

BACKGROUND TO THE INVENTION

This invention relates, in general, to a music system and is particularly, but not exclusively, applicable to a system and methodology for contextual synchronization of sections (or slices) of a digital audio track relative to real-world events. The sections are characterized in terms of a user-perception and/or machine-based evaluation that categorizes each audio section in terms of a perceived "theme" as suggested to the user or machine by an underlying rhythm or beat detected or otherwise identified within the audio section.

SUMMARY OF THE PRIOR ART

The music, film and gaming industry—and particularly aspects relating to the provision of content—is evolving. In this respect, the sale or distribution of (for example) music or soundtracks as either streamed or downloaded digital files is becoming dominant in those markets. This contrasts with the sale of compact disc and DVD technologies (or, historically, vinyl disks) through established, but now waning, custom retail outlets.

Whilst music sales are commercial and content perceptual and aesthetic in nature, there is no existing and straightforward mechanism to identify and assign contextually-relevant audio content to multiple real-world scenarios. Indeed, it has been recognized that content supports emotional, physiological and/or psychological engagement of the listener or user and therefore promotes the listener's or user's sensory experience. One of the issues faced by the industry is therefore how best to augment the listener/user experience, especially on a personal/individual level. Indeed, it has long been recognized that the contextual relevance of or relationship between a piece of music and an event brings about recognition or induces a complementary emotional response, e.g. a feeling of dread or suspense during a film or a product association arising in TV advertising. Another example relates to interval training in so-called "spin" static cycle exercise classes that frequently make use of continuous background music interspersed with short bursts of music associated with higher cardio work rates and greater energy output through increased numbers of leg revolutions per unit time. In *The Encyclopedia of Human-Computing Interaction*, 2013, 2$^{nd}$ Edition, its author (M. Hassenzahl) describes how the "wake-up experience created by an alarm clock substantially differs from the experience created by sunrise and happy birds", and then questions whether it is possible to "create technology which understands the crucial features of sunrise and birds and which succeeds in delivering a similar experience, even when the sun refuses to shine and the birds have already left for Africa."

Consequently, technical adaptation of digital content and file formats offers the possibility of influencing, shaping and/or designing user experiences (both singular and collective) in new and innovative ways. Technical adaptation does not, however, need to be restricted to future works, but can also be applied to back catalogues of music stored in accessible databases to provide a new lease of life to such stored music and the like, e.g. within a controlled licensed environment and within the context of a user-customized life experience.

There are numerous algorithms available that perform tasks related to music transcription or musical interpretation. For example, the following technical papers identify known techniques that may be for automated music information retrieval ("MIR") and, therefore, one or more of such processes may find use as a component within one or more of the embodiments or applications of the invention (as described herein):

i) Pitch detection algorithms have been discussed in the article "Blackboard system and top-down processing for the transcription of simple polyphonic music" by Bello, J. P., appearing in the technical publication Digital Audio Effects, DAFX [2000]. A second technique was described in the article "Non-negative matrix factorization for polyphonic music transcription" by Smaragdis, P. and J. C. Brown, IEEE Workshop on Applications of Signal Processing to Audio and Acoustics [2003].

ii) Onset and offset detection has been discussed in the article "Complex Domain Onset Detection For Musical Signals" by Duxbury, C., et al., 6th Int. Conference on Digital Audio Effects (DAFx-03) [2003], London, UK. Another article in this field is "Onset Detection Using Comb Filters" by Gainza, M., B. Lawlor and E. Coyle, IEEE Workshop on Applications of Signal Processing to Audio and Acoustics [2005].

iii) Key signature estimation discussed in "Musical key extraction from audio" by Pauws, S., International Symposium on Music Information Retrieval, Barcelona and "Detection Of Key Change In Classical Piano Music" by Chai, W. and B. Vercoe, ISMIR, London [2005].

iv) Tempo extraction as discussed in "Tempo and Beat Analysis of Acoustic Musical Signals" by Scheirer, E., Journal of Acoust. Soc. Am., 1998. 103(1): p. 588-601. Another approach was provided in the article "Causal Tempo Tracking of Audio" by Davies, M. E. P. and M. D. Plumbley, Proceedings of the International Conference on Music Information Retrieval, Audiovisual Institute, Universitat Pompeu Fabra, Barcelona, Spain [2004].

v) Time signature detection as discussed in papers co-authored or jointly authored by Gainza, M. and E. Coyle, especially: a) "Time Signature Detection by Using a Multi-Resolution Audio Similarity Matrix, Audio Engineering Society 122nd Convention, Vienna, Austria [2007]; b) "Automatic Bar Line Segmentation", Audio Engineering Society Convention Paper, presented at the 123rd Convention, October, New York, N.Y., USA [2007] and c) "Time signature detection by using a multi resolution audio similarity matrix", 122nd. Audio Engineering Society Convention, May 5-8, Vienna, Austria [2007].

Films released by movie corporations, such as Sony Entertainment, clearly have a sound track that is edited and generally synced to the action frames as assembled into the film. Indeed, moving images (for example in film and television and computer games) often require a musical track to accompany them. This process is known as music synchronisation. Professionals are employed by rights holders and film makers to perform searches on large catalogues of creative music to find appropriate pieces for synchronisation. A laborious editing task is then carried out to fit the piece of music to the piece of footage; this task requires specialist equipment and is not customizable by the end-user/movie watcher. In fact, the score is subjectively assembled and approved by the studio. It is also not dynamically configurable against real time events.

Also, another problem relates to access and searching of information stored across a plethora of different databases that have different storage formats. In this respect, the language employed within the synchronisation industry community is multi-variate and involves multiple repertoires that are at times conflicting. In fact, terminology may have different meanings in different contexts, and these are dynamic and negotiated. Use of a natural language interface would translate to a meaningful search system for users. It has been widely acknowledged that the massive expansion in digital music over recent years has presented complex problems for users, and requires powerful knowledge management techniques and tools.

In a similar vein to film media syncing, so-called "spin classes" that use static exercise bikes make use of accompanying music, but this is just background that is used by the PT instructor as distraction and an aid to having the class members undertake intensive training or active recovery. There is no ability for the backing music track and, in fact, the audio broadcasting system that plays the music to be dynamic and react to real-time changes. Like all existing audio broadcast or speaker systems, the audio track is simply played and therefore follows precisely the arrangement of the pre-recorded music track.

SUMMARY OF THE INVENTION

According to a first aspect of the invention there is provided a method of fading between a first audio section and a second destination audio section, the first audio section and the destination audio section each containing an onset representative of a significant audio event, the method comprising: determining, relative to a common temporal reference point, a relative temporal position of an onset in each of the first audio section and the destination audio section; assessing which respective onset in the first audio section and the destination audio section occurs earliest in time with respect to the common temporal reference point; and effecting a cross-fade between the first audio section and the destination audio section at a rise of said earliest onset, such the destination audio section replaces the first audio section as an active audio output and wherein the cross-fade occurs simultaneously across both the first audio section and the destination audio section to realize a seamless rhythmic transition in audio output.

In another aspect of the invention there is provided an audio system comprising: a processor; and a storage device containing a multiplicity of digital audio files each partitioned into at least one audio section characterized by a contextual theme, each of said at least one audio sections having an onset representative of a significant audio event; wherein the processor is arranged to: determine, relative to a common temporal reference point, a relative temporal position of an onset in each of a first audio section and a second destination audio section, wherein the first audio section is controllably played and the second destination audio section is to become active and played; assess which respective onset in the first audio section and the second destination audio section occurs earliest in time with respect to the common temporal reference point; and effect a cross-fade from the first audio section to the second destination audio section at a rise of said determined earliest onset, such that the second destination audio section replaces the first audio section as an active audio output and wherein the processor is arranged to cause the cross-fade to be initiated simultaneously in a time domain for both the first audio section to the second destination audio section, and wherein the processor is further arranged to maintain, after transition of the audio output to the second destination audio section, a rhythmic pattern established in the audio output by the first audio section.

In a further aspect of the invention there is provided a method of determining the presence of an onset in a section of an audio signal, the method comprising: separating transient parts of the audio signal from a relatively stationary part of the audio signal to produce a time domain representation; generating an amplitude envelope of the transient part; setting a power threshold and detecting localised peaks in the amplitude envelope that exceed the power threshold; and with respect to the localised peaks, analysing the transient signal at a multiplicity of sampling points identified by the transient amplitude envelope, said analysis measuring at each sampling point a characteristic over a predetermined period both before and after each sampling point; and identifying, as the onset, a sampling point having a measured characteristic that is maximally different between the predetermined periods before and after the sampling point.

In yet another aspect of the invention there is provided an audio system comprising: a processor; and a database containing a multiplicity of digital audio files each partitioned into at least one audio section characterized by a contextual theme, each of said at least one audio sections having an onset representative of a significant audio event; wherein the processor is arranged to: for each digital audio file in the database, separate a transient part in each audio section from a relatively stationary part of the audio signal to produce a time domain representation; generate an amplitude envelope of the transient part; set a power threshold and detecting localised peaks in the amplitude envelope that exceed the power threshold; and with respect to the localised peaks, analyse the transient signal at a multiplicity of sampling points identified by the transient amplitude envelope, said analysis measuring at each sampling point a characteristic over a predetermined period both before and after each sampling point; and identify, as the onset, a sampling point having a measured characteristic that is maximally different between the predetermined periods before and after the sampling point; and use said identified onset to transition between a first contextual theme to a second contextual theme.

In still yet another aspect of the invention there is provided a database containing a multiplicity of accessible files, the database comprising: a multiplicity of audio sections for digital audio files, each audio section mapped to a contextual theme defined with respect to identifying musical timing for the audio section, each theme itself mapped to at least one entry point and at least one exit point, said entry and exit points supporting a seamless fade transition between different audio sections and wherein each of said at least one entry point and said at least one exit point relates to an anacrusis event for the section as expressed in terms of beats and fractions.

In still yet a further aspect of the invention there is provided a method of splicing together two audio sections having pre-identified contextual themes reflected in related metadata of the two audio sections, each of the two audio sections having a start point and an end point related to its assigned theme, the method comprising: producing a first time base for each of said two audio sections by partitioning each audio section into rhythmic beats each having an identified tempo; producing a second time base by partitioning each beat of each audio section into measureable fractions by dividing each beat into at least a plurality of equal and evenly-spaced time divisions within each beat; determining at least one entry anacrusis in a destination audio section that is proposed to follow a first audio section, each of said at least one entry anacrusis providing a first timing displacement in terms of beats and fractions relative to the start point for the destination audio section; determining at least one exit anacrusis in the first audio section, each of said at least one exit anacrusis providing a second timing displacement in terms of beats and fractions relative to the end point for the first audio section; contrasting the first timing displacement with the second timing displacement to identifying whether there is a correspondence between the first timing displacement and the second timing displacement; and rejecting a potential splice from the first audio section to the destination audio section in the event that there is no correspondence between the first timing displacement and the second timing displacement, otherwise recognizing that the first audio section is splice compatible with the proposed destination audio section.

In another aspect of the invention there is provided a computer program product that, when executed by a processor, causes the processor to execute procedure that performs the method of splicing together two audio sections as claimed in any of claims 13 to 18.

In a further aspect of the invention there is provided an auditory augmentation system comprising: a database in accordance with claim 12; a processing system coupled to the database and responsive to said metadata; and an input coupled to the processing system, the input identifying a changing nature of events presented as a temporal input to the processing system, each event categorized with a theme; wherein the processing system is arranged to correlate the categorized themes of said changing events with said contextual themes for audio sections and is further arranged automatically to select and splice together audio sections to reflect said events as the temporal input varies.

Embodiments of the present invention permit identified musical phrases or themes to be synchronized or otherwise linked into a real-world event. In this context, "musical phrases or themes" define a "section" of audio that have a set of definable characteristics that complement, reflect or otherwise match the contextually-perceived and identified nature of events presented as a temporal input. The sections of audio therefore "serve the aesthetic of" the context of events. The achieved synchronization beneficially realizes a seamless musical transition—achieved using a timing base to match accurately a pre-existing but identified music signature or beat—between potentially disparate pre-identified musical phrases having different emotive themes defined by their respective time signatures, intensities, keys, musical rhythms and/or musical phrasing. The preferred embodiments therefore augment overall sensory experiences of a user in the real world by dynamically changing, re-ordering or repeating and then playing audio sections within the context of what is occurring in the surrounding physical environment, e.g. during different phases of a cardio workout in a step class the music rate and intensity increase during sprint periods and decrease during recovery periods. The accompanying music is automatically selected in real-time to accompany changing physical or local environmental events, with synchronization of the audio sample causing that audio sample to become an integral but complementary part of an overall sensory experience.

Advantageously, the present invention provides a new and innovative digital format technology. A software editing suite, optionally provided in the form of a downloadable application, provides a consumer with the tools to edit and re-engineer existing music content dynamically and in real-time to achieve syncing to user experiences. More particularly, the system and methodology provide opportunities for dynamic syncing of digital music content to match lifestyle, activities and consumer choice, with synchronization based on a characterization of a theme in a defined audio section and the subsequent establishment of suitable entry and exit points from that audio section based on anacrusis events within the audio section. The software application permits for the selective re-imaging and track synchronization of, for example, a user's favourite songs to specific physical stimuli to suit the conditions of the moment, like going for a run or a taking a walk or alignment with a scene in a video clip, thereby producing a customized and user-bespoke experience. The system therefore produces and supplies for use, such as immediate play or broadcast, a composite media file that correlates instantaneous or changing real-word events with customized and user-selectable audio components designed to augment an overall sensory experience.

As such, greater re-use and rearrangement of current digital music for real time syncing to various media is achieved, with use of the metadata-based synchronization applicable across numerous different application areas, including exercise, video gaming, personal video compilation and advertising. Based on changes in the environment, the system of the preferred embodiments create, and more especially edit and re-assemble, music content presented in one or more temporally disparate audio sections or audio files to suit the occasion. Audio output therefore changes, for example, with sensed changes within a game such that the audio output is synchronized music that accompanies the in-game action or the mood and action within a DVD. The resulting music file format, including characterizations of the musical segments with tags embedded in metadata, gives users the ability to use their favourite music tracks on their videos and in social media applications. More particularly, real-time syncing can be accomplished by connecting the system to appropriate sensor(s) that react dynamically to changes in environmental conditions.

Various aspects and embodiments of the invention as outlined in the appended claims and the following description can be implemented as a hardware solution and/or as software.

BRIEF DESCRIPTION OF THE DRAWINGS

Exemplary embodiments of the present invention will now be described with reference to the accompanying drawings in which:

FIG. 10 is an exemplary configuration of a track database in accordance with a preferred embodiment.

DETAILED DESCRIPTION OF A PREFERRED EMBODIMENT

Figure 1:
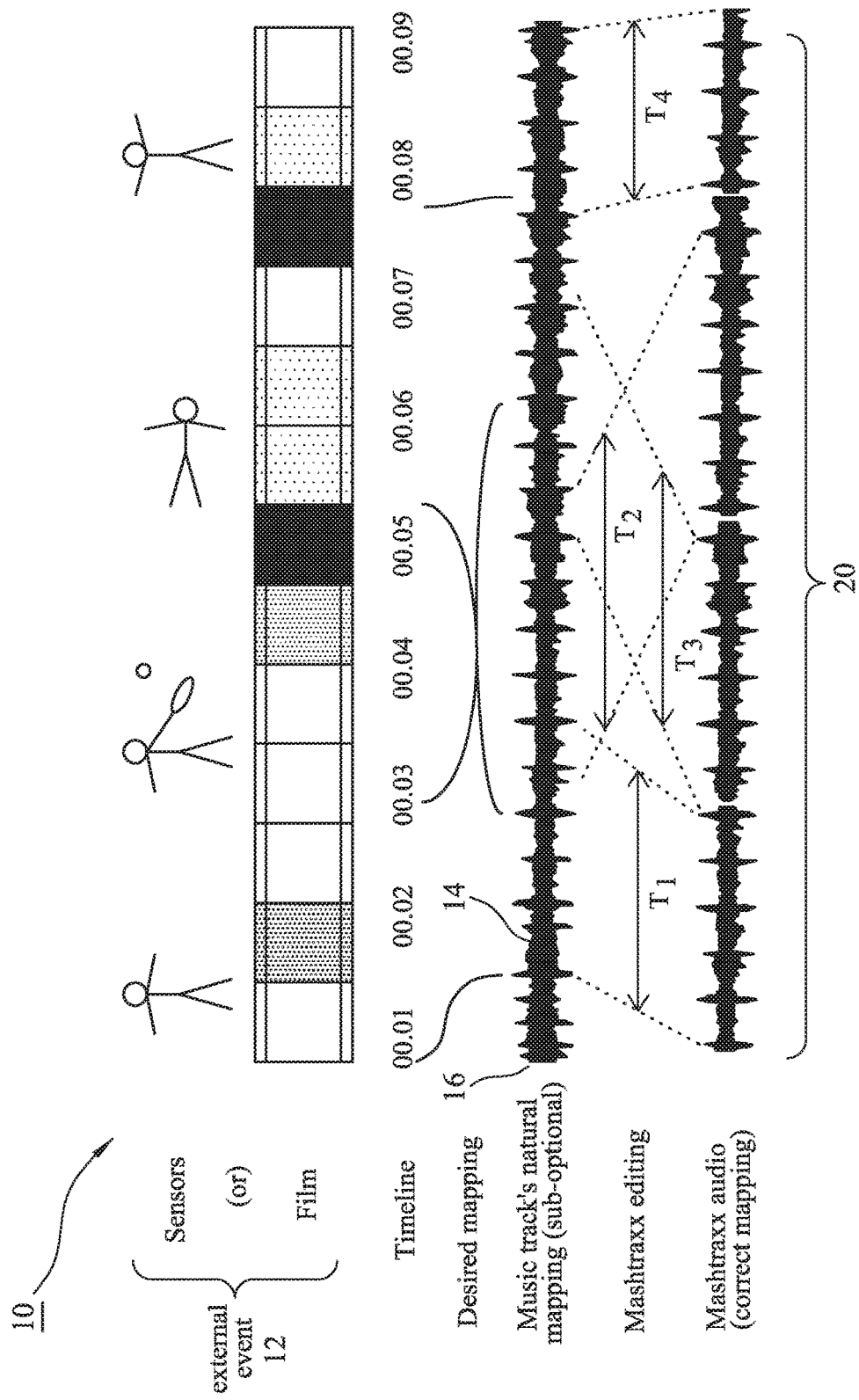
FIG. 1 is a diagram representative of a relationship that is established between a real world event and a piece of audio, such as a section of music and wherein the relationship is established in accordance with the present invention.

FIG. 1 is a diagram 10 representative of a relationship that is established between a real world event 12 and a musical theme 14 of an audio track, the relationship established in accordance with the present invention. For example, the event 12 may be monitored or otherwise sensed (such as via a sensor or telemetry device worn by a person exercising), or may be pre-recorded and present on a media (such as a succession of scenes frames of a film). With the passage of time, the real world events 12 change, with the events 12 therefore differentiable from each other.

Taking an exercise example as purely exemplary (or indeed a film of someone exercising), the person who is exercising may go through a warm-up state between, say, commencement (time zero) and the end of minute two, an active exercise phase between the end of minute two and end of minute six, a recovery period between the end of minute six and the end of minute eight and finally a cool-down period between the end of minute eight and the end of minute nine. The different active periods within this exercise regime potentially, if not always, warrant different treatment in terms of a contextual music accompaniment.

The duration of the activity is described in terms of whole minutes, but this is purely exemplary and could equally be based on seconds or other periods. The time of transitions between exercise activities are also selected arbitrarily in the example for ease of explanation, and transitions therefore could occur at any appropriate trigger point. For example, the transitions may be driven by a sensor that is actively monitoring and reporting a person's heartrate during an exercise programme. In terms of a film, selected transition points can be at the end of a scene or be tied to the appearance of a character or aspect of a speech.

In FIG. 1, to provide an immersive effect, the activity 12 is augmented by a contiguous music track 14 that follows a natural path reflecting the original recording by the artist. However, whilst the start of the track 16 may be initially started to coincide loosely and approximately with the very beginning of the warm-up state at time zero, the track quickly becomes disassociated with the event and thus just background, i.e. the natural audio is sub-optimal for the purpose of supporting or augmenting the real world event to which it is loosely associated.

However, it has been recognized that different sections of, for example, a music audio track actually can have direct relevance to different temporal event activities and that transitions between different sections of audio (based on a commonly identified theme in the section and the temporal event) are desired to augment an overall sensory experience. In other words, there are themes present within sections 14 of a musical score, with these sections having different durations and different emotive qualities that can be categorized by a user or device based on a qualitative (and/or quantitative) assessment. The term "theme" should therefore be understood to be a generic description of selected properties or perceived attributes that are assignable to a section of music (or other audio sample) by a user and/or MIR process based on a perceived contextual meaning for an identified audio section.

An embodiment of the present invention therefore operates to identify sections and to store sampled segments of music (or the like) within a database. Each section 14—each of which may a have different duration $T_1$-$T_4$—is encoded with metadata that identifies the section (and its theme) and/or particularly resolvable contextual qualities of the section 14. Access to and reference of the metadata allows the sections to be subsequently re-ordered in time so as to permit alignment of the sections with related, i.e. relevant, real world events.

Preferably, the system never alters the original audio file, but rather it makes use of assembled metadata that allows a playback engine to jump around a suitably encoded file, editing and cross fading it in near-real time (save for some appropriate buffering to allow for processing).

By way of non-limiting example in the context of exercise, a music track may include an upbeat tempo for a chorus, with the upbeat tempo therefore appropriate for a faster heart rate induced by a higher rate of energy output during a sprint part of the exercise. In contrast, the same music track may include a half-time section. The half-time section would therefore be more appropriate to an active recovery period during the exercise, but not the sprint. The presently claimed invention therefore produces a variety of identified sections, i.e. slices of a track, that can be moved in time so as to align more appropriately with externally-driven activity. This movement in time may cause the reordering of sections, i.e. a naturally contiguous sequence in an original music track may yield a sequence $T_1$, $T_2$, $T_3$, $T_1$, $T_5$, $T_6$, $T_1$ where $T_1$ is a repeated chorus and $T_2$ to $T_6$ are verses, themes or musical movements. This movement in time also may cause the overall duration of audio output to be extended or truncated in relation to the original music track. Identification of the theme and the storage of a related characterization of the section into metadata might lead to a re-aligned ordering of the section (relative to a film) that produces an audio output having a different sequence $T_1$, $T_1$, $T_6$, $T_2$, $T_3$, $T_1$, $T_1$, $T_1$. This reordering is represented in FIG. 1 by the "Mashtraxx" audio spectrum 20 that shows this re-ordering of Mashtraxx sections. Preferably, adjacent sections are contiguous with each other, e.g. there is no discernible change in music rhythm and/or there is no discernible silence between adjacent sections. A mechanism of fading between an active sample section of a track and a stored section (of either the same track or a different track) is described later having regard to FIG. 5 and FIG. 7.

Embodiments of the present invention permit identified musical sections to be synchronized and linked into a real-world event. The achieved synchronization includes a seamless musical transition—achieved using a timing offset, such as relative advancement, preferably to match accurately a pre-existing but identified music signature or beat—between potentially disparate pre-identified sections having different emotive themes defined by their respective time signatures, intensities, keys, musical rhythms and/or musical phrasing. The preferred embodiments therefore augment the overall sensory experience by changing between musical sections (and thus differing themes) within the context of what is occurring in the surrounding physical environment, e.g. during different phases of a cardio workout in a step class the music rate and intensity increase during sprint periods and decrease during recovery periods. The accompanying music (or audible content, such as non-diegetic and diegetic sound design or acousmatic sound) is automatically selected in real-time to accompany a changing physical event—which may be monitored electronically in real time, such as with a heart-rate monitor—and thereby forms an integral but complementary part of an overall sensory experience. Rather than real-time monitoring, the accompanying audio sample, such as a snippet of music, can be pre-programmed to be tied and played with a trigger point, such as a change in scene within a video game.

Figure 2:
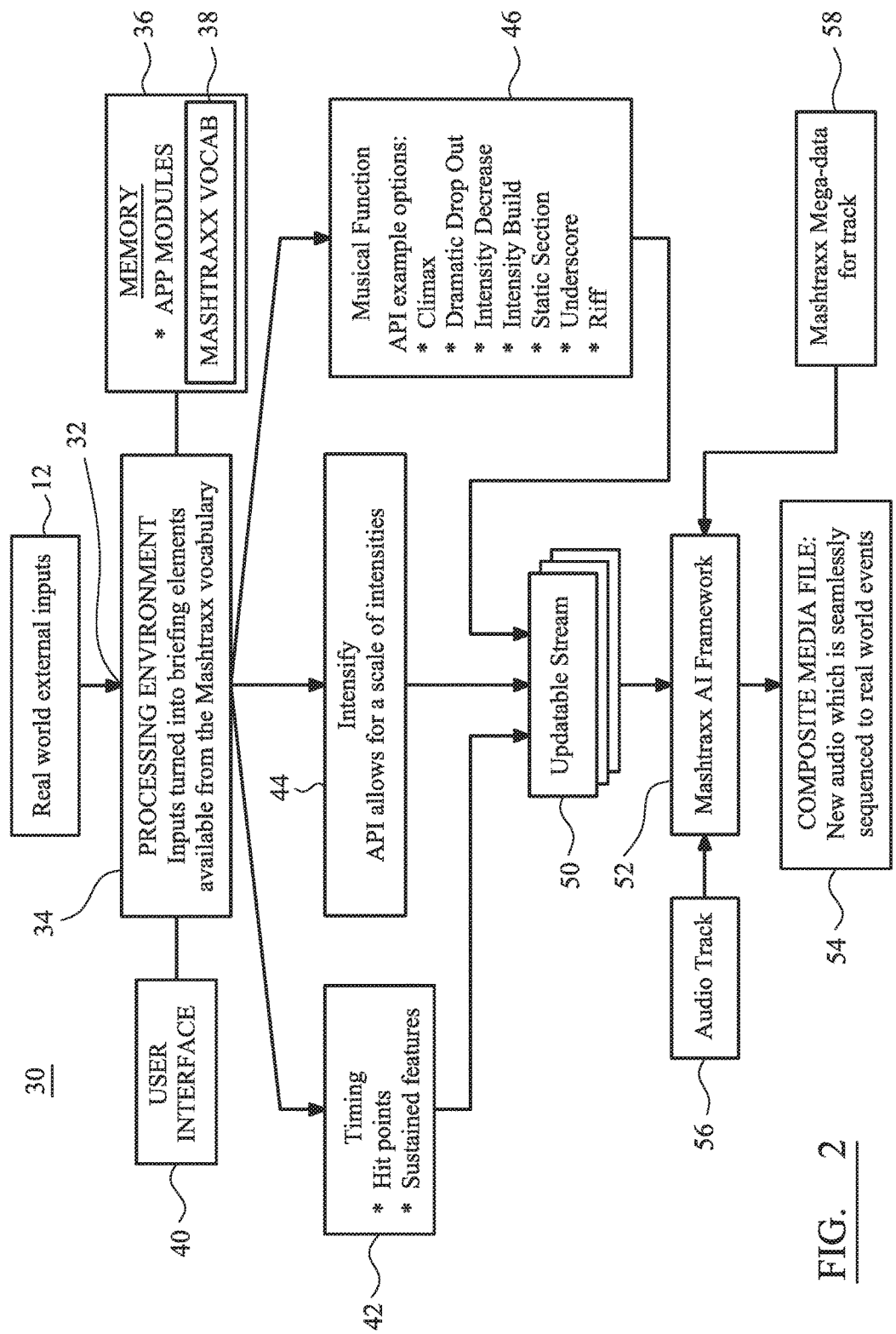
FIG. 2 is a schematic representation of a system in accordance with a preferred embodiment of the present invention.

Turning to FIG. 2, there is shown a schematic representation of a system 30 in accordance with a preferred embodiment of the present invention.

As indicated above, as an input, the system 30 acquires real world external events 12. These can be real-time sensed events or recorded events stored on a medium and presented to the system through a communications interface 32. A processing environment 34 typically includes at least one processor that runs program code stored in memory 34.

The processing environment 34 may be supported on a variety of platforms, including a server connected through a network, a tablet computer, PC or a smartphone.

The memory 36 may be local to the processing environment 34 or remotely located in a distributed system. Applications ("apps") stored in the memory 36 permit for the automated analysis of real world events and, moreover, permit characterization of sampled time-domain data within the events relative to a pre-identified vocabulary of terms 38 (which are also stored in memory 346). In practical terms, an input signal corresponding to a monitored or recorded external event 12 can contain multiple different characteristics, e.g. differing heartrates associated with different phases of exercise and active recovery (such as shown in FIG. 1) sensed and reported from a real-time monitor, or otherwise in the context of a video there may be identifiably different facial expressions, different pixel intensities and/or rates of pixel movement for a blob as it moves across a screen. Other characteristics reflective of an emotion or activity may be defined.

The common thread is that identifiable characteristics vary with time since external activity changes with time since the emotional or physical state of the environment or individual changes with time. The event input—regardless of form—can therefore be considered to be an assemblage of multiple contiguous event segments of sampled event data having different but identifiable themes. Functionally, the processing environment 34 is configured to reference each event segment against at least one pre-stored vocabulary word, with this reference recorded either permanently or on a transitory basis with the event segment. The vocabulary words for each event segment act as a key or "briefing element" that can be subsequently used to cross-reference and ultimately select a relevant audio section that has similarly been characterized with a corresponding or closely related vocabulary word which can be stored within metadata for the audio track, stored in an associated file and most preferably compartmentalized within a header for each audio section. Unless the specific context requires a more limited interpretation, the terms "audio section", "segment", and "audio slice" should be considered as equivalent and representative of varying length samples from within a digital audio file.

As a secondary input to the processing environment 34, a user interface 40 may be provided to permit a user to critique the external event input 12. This critique function may be independent or complementary to the automated analysis that generates the briefing elements. The manual critique therefore also ascribes and attaches vocabulary words to events segments and therefore provides an alternative or supplementary process for generating briefing elements.

Returning to FIG. 2, the functional analysis of the external events as performed by the processing environment can include:

i) Relative and/or actual timing 42 within the external event 12. For example, timing analysis can identify events that satisfy a minimum threshold value, events/features that have a sustained duration and/or hit points. A hit point is a given moment on the timeline of a game or film when some action happens that requires a musical feature to occur at, i.e. "hit", the same time. Another industry name for a hit point is "Mickey Mousing", e.g., in a Tom and Jerry cartoon, there may be a loud wood block note sounded after a bowling ball has rolled along a shelf and then fallen to the head of Tom, the cat. Alternatively, sometimes hit points take a given length of time; this is more aptly referred to as a "sustained feature". For example, after the bowling balls has fallen on Tom's head and after it has bounced away, Tom shakes uncontrollably for three seconds. A related sustained feature might therefore be realized by the sound made by a ruler as it is twanged on a desk, with the sound of the vibration sustained for a period of three seconds before being faded out or ending.

ii) Intensities 44 and the scaling of intensities within the external event. For example, intensities can be based on relative light levels or sound levels or changing rates in a monitorable function (such as heartrate) received from the external source via the input 32. Intensity may also relate to an emotionally-perceived intensity that identifies how a particular section in a piece of audio is significant or subordinate relative to other sections in the entire piece of audio, which may me a complete song or compilation of tracks from different audio sources or recordings, e.g., different tracks from different audio CDs. Intensity can therefore be a subjective measure set according to a user's taste or preference.

iii) Audio function analysis 46, including but not limited to beat analysis, time signature analysis, climatic movement identification, intensity increases or decreases, dramatic drop out where audio suddenly ceases, static or rhythmic analysis, underscoring and identification of a riff.

Once the event segments have been keyed to and briefing elements therefore produced, these events segments can be streamed over a network or otherwise stored 50 for later retrieval and use by section assembly intelligence 52. This section assembly intelligence 52 is based on processing support by an artificial intelligence ("AI") and may alternatively be referred to as the "Mashtraxx framework". The section assembly intelligence 52 is configured to provide additional processing and the generation of a new media sample (or "composite media file" 54) in which new audio, such as a new music track, enhances the event segments from the real world event in a seamless and sequenced fashion. The new audio may, in fact, supplement or substitute audio samples captured from the real world event.

The section assembly intelligence 52 is responsive to additional inputs, namely an enhanced audio track 58 containing Mashtraxx metadata 58 for segments or slices of the original audio track. The audio track can, in fact, be multiple samples from multiple user-selected tracks or from a single recorded audio file (which need not be music). The audio track 56 could, for example, be provided by an iTunes® library or streamed or otherwise acquired from a music repository. The generation of Mashtraxx metadata will be described subsequently.

The generation of Mashtraxx metadata will be described in more detail below and in specific relation to FIG. 4. However, in overview, Mashtraxx metadata provides an audio segment definition, including track time signature(s) and other musical properties and/or functions, supplied as data associated with the audio track. A modified digital audio file for a track may include metadata tags that are married to musical events in the track, such as cymbal spills and drum beats. Alternatively, access to the Mashtraxx metadata can be accessed or streamed from an externally managed data repository/database accessed through a local app running of a device. In this latter respect, a device-based app is preferably arranged to pull Mashtraxx metadata from the remote database based on a registered status of the original copyright artistic work, i.e. the audio track, with the local device/user. In the event that the original audio track is deemed an illegal copy, a prohibition on access to the Mashtraxx metadata can be imposed and/or, otherwise, the app can flag the illegal copy or disable playing of the original track until such time as the track/user is validated by an authenticated licence for the original track.

In a preferred anti-counterfeiting embodiment, a locally-installed app checks local content by fingerprinting the audio; this can be based on any number of known techniques, including track metadata in the track header and/or intra-track analysis through audio sampling. The app is configured to then check a central database containing Mashtraxx data, with the check revealing whether Mashtraxx data exists for the identified track. If so, the app is configured to present the Mashtraxx data to the user as a Mashtraxx option within the app.

Acquiring a licenced status is well understood and is typically based on a registration process. Registration for copyright usage is not, however, germane to the fundamental issues of the present invention and, especially, the creation of metadata tags that are used to augment an immersive sensory experience associated with coordinated audio complementing changing real-world events.

Figure 3:
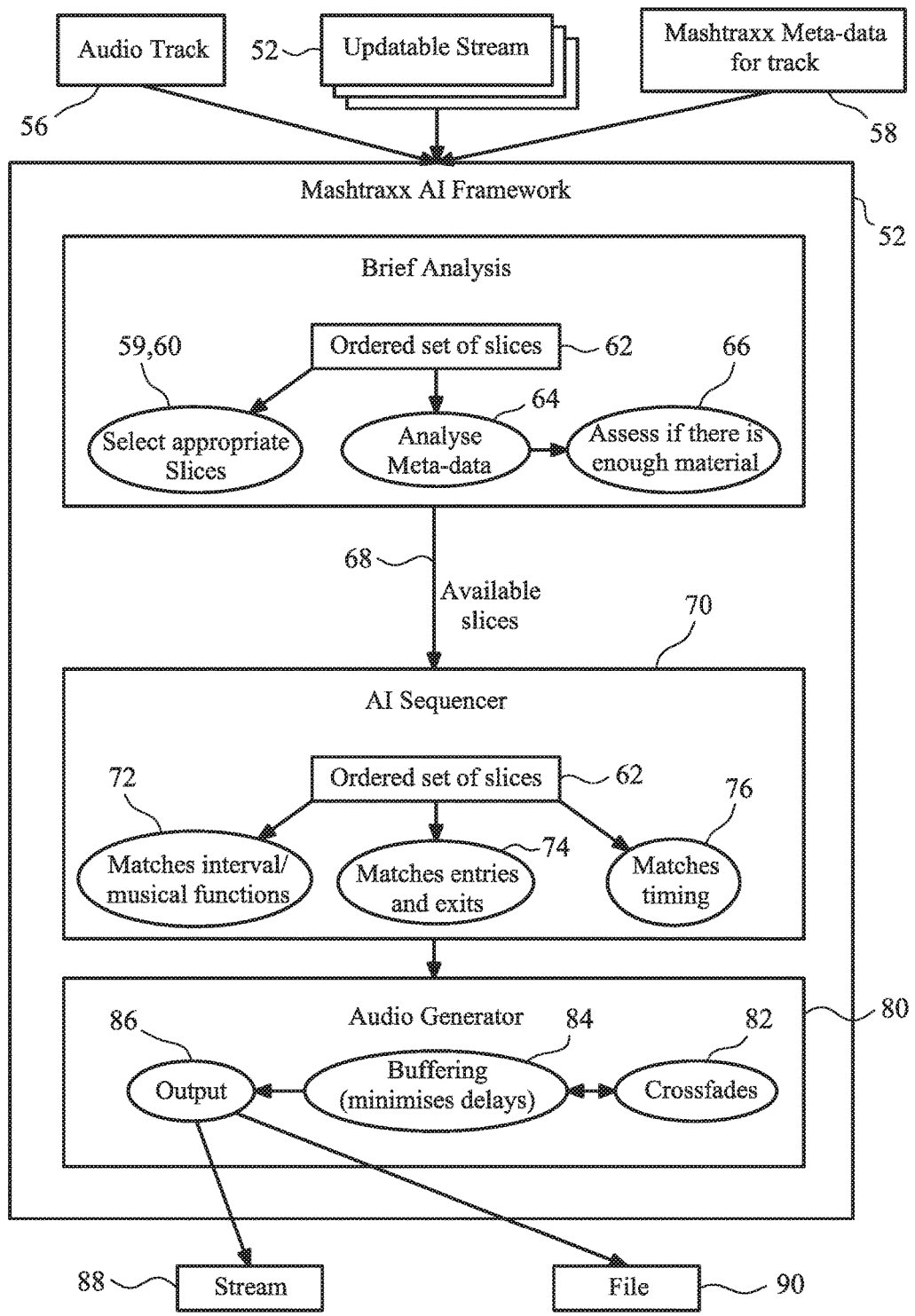
FIG. 3 is a functional diagram of section assembly intelligence employed within the system of FIG. 2.

FIG. 3 is a functional diagram of section assembly intelligence 52 employed within the system of FIG. 2.

For the audio sections that are to be inserted and which have been pre-characterized in terms of their inherent themes (for which a tag has been placed in the corresponding metadata of the audio sections, as will be explained later), the section assembly intelligence 52 selects 59 and orders 60 the audio sections to correspond to the real-word event(s). This results in an ordered set of audio sections 62 that may include contiguous repeating passages of music. Selection of the appropriate audio section requires consideration and analysis 64 of the metadata tag and, optionally but preferably, an assessment 66 of whether the selected audio section 62 in itself contains sufficient material to provide for its insertion. A determination that there's insufficient material leads to one or more of a rejection of the audio section, a decision to repeat, i.e. loop, the audio segment so as to fill the entirety of the duration for the real world event, and/or advising of the user through the user interface (of, for example, FIG. 2 when typically realized to include a graphic user interface "GUI"). Looping may involve an intra-section loop reflected by pre-storage of a metadata tag. This intra-section loop permits establishment of a loop internally within a section and therefore defines cut points that are internally self-consistent.

Selection of the audio segment may be dictated by direct user input of a briefing note into the system through a control interface. The briefing note indicates variable parameters including, but not limited to, duration, the nature of hit points within a track and the mood of the track. Alternatively, the user may be presented with multiple alternative track options each having a common theme, and then ask to indicate a preference. A fully automated system is an alternative.

Independently of the process that actually executes a fade and/or direct cut from an active audio track to a destination track (as discussed with particular regard to FIGS. 6a to 6c), the frame assembly intelligence 52 is configured to assess whether sections in different tracks are fundamentally compatible and, preferably, compatible to the extent that they are able to be spliced or cut together to produce an audibly seamless transition therebetween. The preferred process will now be described with reference to FIGS. 7, 8 and 10.

FIG. 7 is a spectral representation of different sections of music, the sections having exit and entry points determined in accordance with a preferred embodiment of the present invention. FIG. 7, which shows an edit point process that can be executed independently for aligning related themes in selected audio sections, is a precursor to re-arrangement of selected audio sections into a consolidated data format that, eventually, is aligned with real-word events to augment the sensory experience by reinforcing a contribution made to an accompanying sound stage.

Figures 7A, 7B:
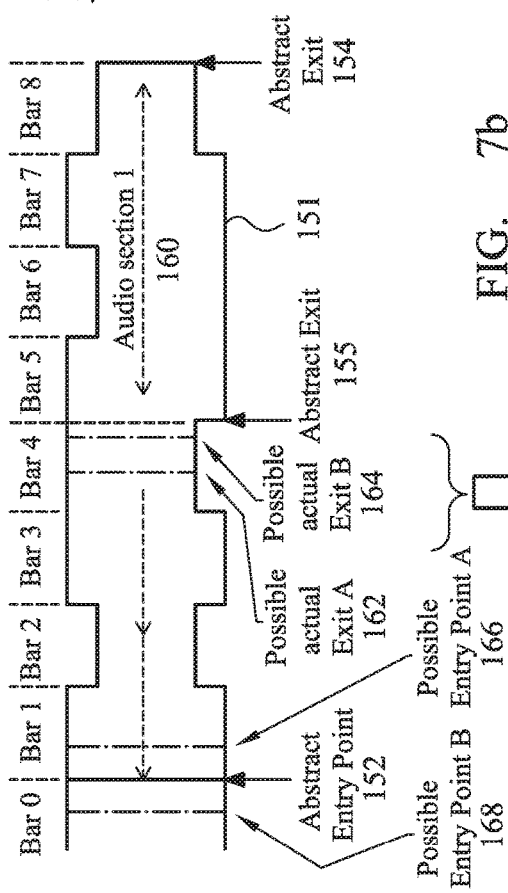
FIG. 7, composed of FIGS. 7a to 7c, is a spectral representation of different sections of music, the sections having exit and entry points determined in accordance with a preferred embodiment of the present invention.

In FIG. 7a, an audio spectrum 151 for an audio section ("audio section 1") where envelope change are highly simplified and shown as blocks with abrupt transitions. The spectrum 151, as will be understood, has a time domain representation that varies with time. A time base, in the form of musical bars ("Bar 1" to "Bar 8" for section 1), partitions the audio section between a nominally identified "abstract" entry point 152 and a nominally identified "abstract" exit point 154. The abstract entry point 152 and abstract exit point 154 therefore define the audio section, with these abstract points determined and selected by either an MIR function and/or user input to identify a characterizable transition between different themes within the totality of, for example, an entire song track. "Themes" are therefore contextually different aspects with an audio track or assembled composite. Themes can classify a context of a section both in terms of perceived/identified similarities or differences. Themes are therefore coded within a database related to the sections of the track and may be coded directly into ascribed metadata.

Unfortunately, it has been recognized that, because of the nature of audio, the abstract entry point 152 and abstract exit point 154 will likely not coincide with effective, i.e. actual, exit points 162, 164 and entry points 166, 168 for an audio section. For example, within section 1 (reference numeral 160 of FIG. 7a), there may be one or more possible abstract exit points 154, 155, with each abstract exit point 154, 155 having one or more actual exits points 162, 164. In this exemplary context, a theme transition may be identified to occur at the transition between Bar 4 and Bar 5, whereas actual exit points 162, 164 (that take into account a time base and beat) could occur at different times within Bar 4.

Before being able to transition between sections, it is therefore necessary to look for compatibility between different sections and, moreover, timing transitions that provide a substantially seamless audible transition. In the first instance, identified and applied metadata tags can provide an indication of acceptable correlation between different themes. For example, assuming a numeric scaling of theme between one and eight, a first audio section may have a theme one characterization that might be representative of a slow and melancholic scenario. In contrast, a second audio section may have a theme two characterization that might be representative of a slightly faster (relative to the first audio section) and contextually more intense atmosphere. A third audio section may have a very energetic perception and therefore be characterized as having an intensity (i.e. a user-defined level) scaled at a level eight-of-N (where N is an integer) characterization. In this example, a transition between theme one of a first section to another theme one in a different music section appears eminently achievable from the perspective of a seamless audible transition. It may also be possible to transition seamlessly between the first section and the second section given the apparent closeness in characterizations. However, in reality, it may not be feasible to transition from the first section to the third audio section just based on an assessment of characterization of the underlying theme to the respective audio sections. The preferred embodiment, however, provides a solution to this seamless audible transition issue.

It is therefore necessary, in accordance with the present invention, to investigate further the nature of the actual exit and entry points between an active audio section and a proposed destination audio section that is to be cut into the audio. Actual exit points are selected from at least one and usually a plurality of suitable exit points that tie into an identified anacrusis. Suitable exit and entry points are identified (and stored in a database) for each audio section in advance of editing so that minimal buffering is required by the intelligent processing environment 52 to assemble an edited audio that is complementary to a resolvable flow of external event stimuli. Transition between audio can therefore be achieved substantially in real-time, with no discernible loss of audio continuity irrespective of whether sections are selected dynamically as real world events unfold.

FIG. 7b is an expanded view of Bar 4 of FIG. 7a. Again, for the sake of clarity, the audio spectrum of Bar 4 is shown as a simplified block form that has signal excursions that vary with time. Bar 4 is divided into four beats ("Beat 1" to "Beat 4"), with each beat further divided into an equal number of fractions ($f_1$ to $f_4$)—in this case four equal fractions per beat. With respect to the abstract exit point 155, actual possible exits points will correspond to a point at or immediately before or after an anacrusis (alternatively and interchangeably referred to as a "pickup" or "onset"), as shown in FIG. 7b in relation to "Possible Actual Exit B 164". An anacrusis is a note or sequence of notes which precedes the first downbeat in a bar of music. Therefore, through MIR and/or user input, anacrusis for actual exit points are identified in proximity to the abstract exit point 155. In the exemplary case of FIG. 7b, the anacrusis precedes the abstract exit point by: i) in the case of a first possible exit point 162, a distance of minus one beat and zero fractions; and ii) in the case of a second possible exit point 164, a distance of zero beats and minus two fractions.

Figure 7C:
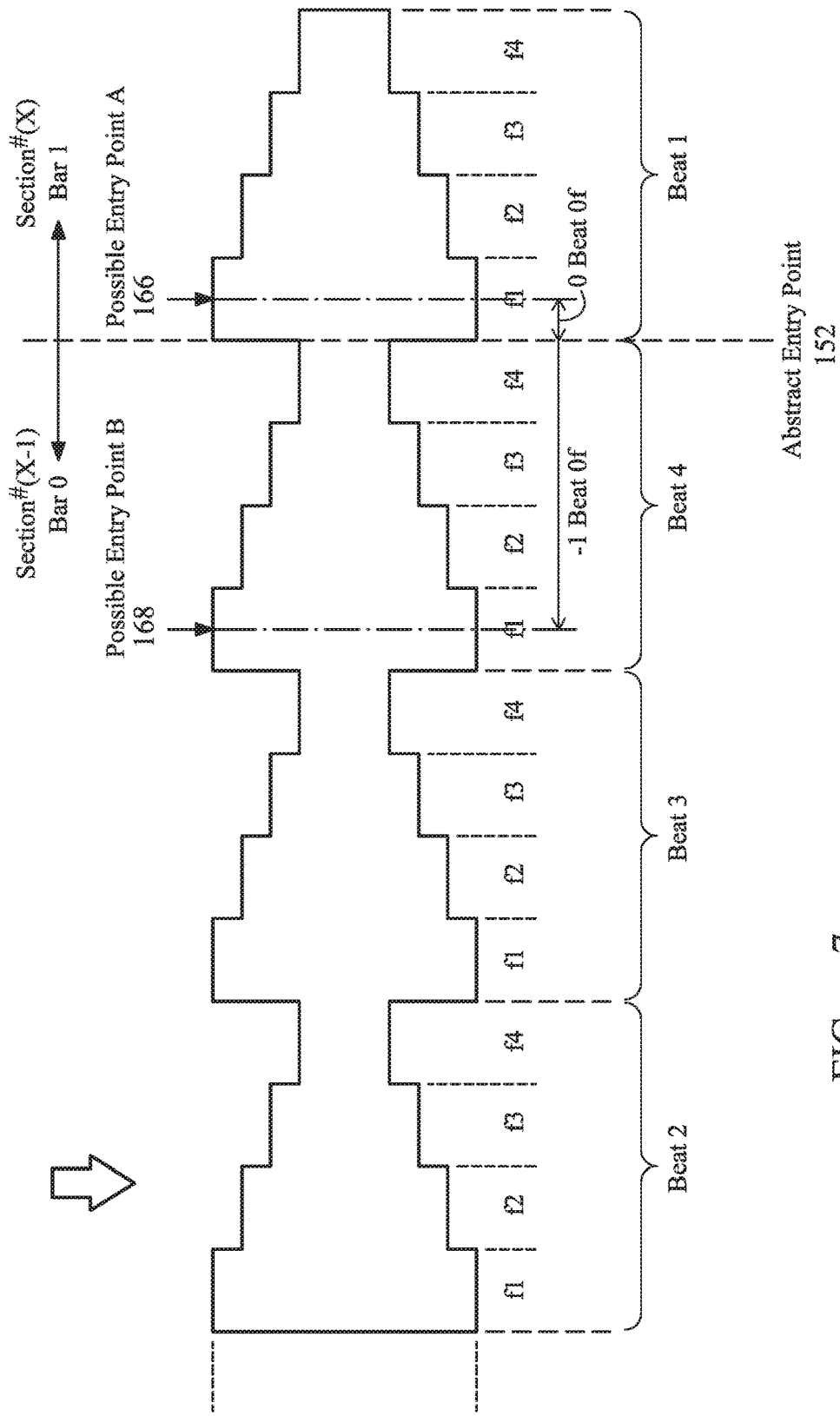

A similar assessment must be conducted to identify an entry point into an audio section. Reference is now made to FIG. 7c. Actual exit points are selected from at least one and usually a plurality of suitable exit points that tie into an identified anacrusis. Again, for the sake of clarity, an audio spectrum of Bar 0 and Bar 1 is shown as a simplified block form in which signal excursions vary with time. Bar 0 and Bar 1 have each been divided into four beats ("Beat 1" to "Beat 4"), with each beat further divided into an equal number of fractions ($f_1$ to $f_4$)—in this case four equal fractions per beat. With respect to the abstract entry point 152, actual possible entry points 166, 168 will correspond to a point at or immediately before or after an anacrusis. Therefore, through MIR and/or user input, anacrusis for actual entry points 166, 168 are identified in proximity to the abstract entry point 152. In the exemplary case of FIG. 7c, the anacrusis straddle the abstract entry point by: i) in the case of a first possible entry point 166, a distance of plus zero beats and zero fractions; and ii) in the case of a second possible entry point 168, a distance of minus one beat and minus zero fractions.

As a summary of the process for identifying precise and actual entry and exit point locations within an audio section, the preferred embodiment partitions the sections of audio (identified in terms of themes) into recurring units of time, e.g. rhythmic beats (which may have a variable duration). Each beat can have its own "tempo", with the term "tempo" being understood to mean the number of units of time per minute. These beats are then divided or "fractionalized" into at least a plurality of equal and evenly-spaced time divisions (termed "fractions"). The number of factions within adjacent beats may vary. The duration of fractions between adjacent units of time ("beats") can, however, be different because of each unit of time potentially has its own tempo. Therefore, with respect to the first time base related to beats and a second fractional quantum measure in a second time base, an approximate location of a potentially suitable but significant entry/exit point, i.e. an anacrusis, is determined relative to a start/end point of an identified section. It is this measured displacement in time—expressed in terms of beats and fractions—to the anacrusis that permits seamless integration of one section of audio to another different section of audio. More specifically, to effect an audibly seamless transition, the processing intelligence of the system looks for an exit point and an entry point—expressed in terms of beats and fractions—that has the same measured displacement (as expressed in terms of beats and fractions).

A database 200, as shown in FIG. 10, is therefore assembled and made available to a device operating within the system of FIG. 2. The database 200 therefore correlates music tracks to related track metadata. More especially, the database maps audio sections 202 to identified themes 204 of tracks 206 and how these themes are defined with respect to a defined timing 208 within the section. Finally, each theme 202 is broken down into at least one and generally a multiplicity of edit-worthy entry points 210 and exit points 212 that relate to anacrusis events (expressed in terms of beats and fractions).

Returning to FIGS. 7b and 7c, the cut between sections would therefore be made from the active audio section at Bar 4 and at the start of Beat 4 (reference numeral 162) to section (X−1), Bar zero, Beat 4 position (that has a anacrusis displacement of one beat, zero fractions) for entry point 168. Of course, other combinations of beat and fractions displacements for the anacrusis will occur, with these driven by the audio. Buffering is used to compensate for timing retardation or advancement, as necessary, to align the cut between different sections.

The objective of FIG. 7 is therefore to support an effective editing function and, more especially, to permit edit points to be identified relative to specific quantized distances from bar transitions—related to any time signature—and beats and fractions of a beat within the rhythm of the audio.

Figure 8:
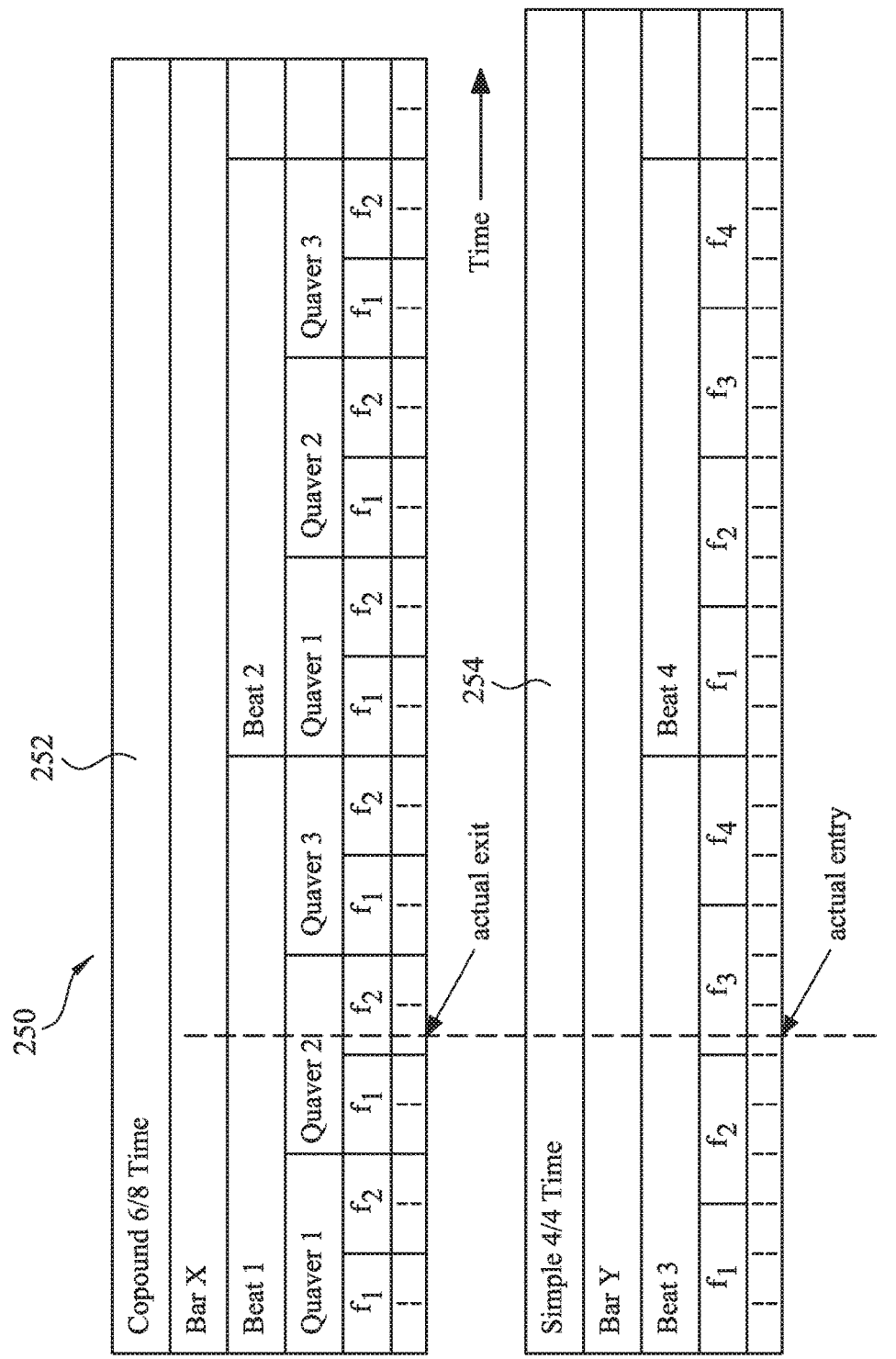
FIG. 8 is a timing diagram showing relative timing between different time signatures in different sections of music.

The database of FIG. 10 stores, as a minimum, cross-referenced entry and exit points for audio sections, with these needing to have correct alignment timing if these are to be spliced seamlessly together. In fact, matching criteria needs to be fulfilled before edit points are calculated. Beats are calculated from onset detection (beat detection), fractions are calculated by evenly dividing the time between beats "Actual entry/exit" and "abstract entry/exit" do not coincide with "abstract fraction positions" and "actual detected beats"; there is no such relationship FIG. 8 is a timing diagram 250 showing relative timing between different time signatures 252, 254 in different sections of, for example, a music track. For example, the time signature in a first audio section may be compound 6/8 time, whereas the timing in a second audio section may be simple 4/4 time. Due to the discrepancy between timing signatures, it is necessary for the system of a preferred embodiment to assess whether, in fact, a recorded displacement (expressed in terms of beats and fractions) between exit and entry points actually corresponds. In other words, cutting between sections must take into account varying time signatures between sections.

In a preferred embodiment, this assessment is achieved by establishing a third time base of pulses that have a length dependent upon a lowest common multiple of fractions within respective bars for different sections, with the bars of the respective sections then partitioned into an equal number of fixed length pulses. The number of pulses in a fraction can therefore differ between fractions of different sections. The system therefore applies a coefficient to align different time signatures, with this coefficient being a ratio between pulses within the different sections.

In the example of FIG. 8, in compound 6/8 time there would be six fractions between adjacent beats. In simple 4/4 time, there would be four fractions between adjacent beats. A resulting lowest common multiple for the product therefore provides a pulse count of six. Consequently, following correlation, a coefficient of 1.5 identifies a cut point (related to a suitable anacrusis) to be present in Bar X, beat 1, quaver 2, fraction 2 of the compound time (in this example), but at Bar Y, beat 3, fraction 3 of the simple time.

The multiplication coefficient results in the time anacrusis in one time signature being interchangeable with others, which may be complex.

Expressly FIG. 8 technically but from a musically perspective:
The simple time signature is 4/4/(16). The 4/4 notation is standard, whilst the 16 means semiquaver fractions; hence, four semiquaver fractions are present in a crotchet beat. The actual exit for the simple time signature of 4/4/16 is minus one beat and minus two 2 fractions from the end of the bar. The end of the bar, in this case, corresponds to the abstract exit.

The compound time signature is 6/8/(16). The 6/8 means there are 2 beats of a dotted crotchet each in a bar. This means there are three quavers in each beat, compared to the simple time signature in which there are only quavers. Likewise, there are six fractions of 16ths compared to four fractions of 16ths.

In this FIG. 8 example, this means that to edit half-way through a beat, one needs to multiply by 1.5 the number of fractions to make the equivalent edit in a 6/8 bar from a 4/4 bar. Hence, to line up the edit point in between the beat, the simple time signature exit is multiplied by 1.5, or conversely, the compound time signature lowest component is divided by 1.5. This means that a grid of $24^{th}$ pulses, of which a $16^{th}$ in the simple time equals three pulses, and the $16^{th}$ in the compound time equals two pulses. The system is therefore able to measure all entries and exits in such pulses and multiply the number by the given coefficient related to the time signature. It is noted that the $24^{th}$ pulses is valid in this example, but may be different in other situations with other time signatures. In practice, the system intelligence says: 'I have a simple time exit at minus one beat and minus two fractions, so therefore −4−2=−6 fractions of 16ths. This gives eighteen pulses and provides three pulses per fraction. For complex time, the pre-calculated exit occurs at minus one beat, minus one quaver, minus one fraction. Therefore, −6−2−1=−9 fractions of 16ths, with this giving eighteen pulses and providing three pulses per fraction, but divided by the compound coefficient of 1.5. Since both are both now normalized to an eighteen pulse length, an exit to this entry exits.

The section assembly intelligence 52 is configured to undertake analysis of any supplied briefing note input, uploaded or otherwise entered by the user through a user-interface. The section assembly intelligence 52 operates to identify and calculate music segments required to fulfil the briefing note, with the identification based on the section-related metadata. The briefing note may be dynamically updateable during the output of a track to reflect changes in user-notified requirements.

Available audio sections 62 are then made available 68 for full sequencing in a sequencer 70 that, preferably, is based on AI logic. The sequencer 70, which is typically implemented programmatically, is configured to select and align appropriate audio segments with corresponding events. Sequencing is based on correlation of the tag placed in the metadata of the audio section with the briefing element, i.e. the Mashtraxx vocabulary word, assigned to each part of the external event that is to be audibly-augmented.

Functionally, the sequencer 70 is configured or arranged to identify and match the music interval or function 72; this is required for a seamless transition between audio sections. Additionally, the sequencer 70 operates to match entry and exit points 74 between different identified themes, wherein an audio section of a first theme is being played and an audio section of a second theme is to be cut into the first theme as the first theme is faded out (rapidly). Again, this is required for a seamless transition between audio sections. Finally, the sequencer 70 matches music timing 76. These functional can be based on music information retrieval "MIR" algorithms (such as those indicated above), although inefficiencies or erroneous automated analysis in MIR evaluations are addressed through the provision of an interface providing a user with the ability to input, overwrite or otherwise define tags applied in the audio section metadata to define the audio/music section theme. Again, this is required for a seamless transition between audio sections. The definition of a segment, as previously indicated, is made in terms of perceived properties to a listener/user and/or quantitatively and/or qualitatively parameters (measured through MIR software) of the audio within the particular section.

The "theme" may be represented in a binary-coded form or a word-based natural language that includes more or less information than the example provided immediately above. For example, user-defined heuristics can be used to provide greater granularity and definition to the briefing note and therefore a more directed selection and assemblage of audio segments. Heuristics may relate, for example, to i) song sequence and therefore the degree of re-ordering of the resulting audio output relative to the ordering of verses and choruses in the original song or soundtrack, ii) segment uniqueness, e.g. an indication on the amount or permissibility of repeated segments, and iii) loop points that establish a point for a "fill" required to lengthen a particular audio segment.

In the limit, the metadata tag for the audio segment could simply be a word that correlates to the Mashtraxx vocabulary used to define the characterization of the current and ongoing external event 12.

An audio generator 80 is coupled to the sequencer 70. The audio generator 80 is configured to manage crossfading 82 between an active audio segment currently being played and a destination segment that is the next scheduled and selected audio segment to be played when the external event changes. This function includes identification of an appropriate transition associated with an anacrusis (alternatively and interchangeably referred to as a "pickup" or "onset"), e.g. a note or sequence of notes which precedes the first downbeat in a bar of music. In terms of the embodiments of the presently claimed invention, the onset—such as a downbeat—is important in that its omission or mistiming can be discerned and representative of an unnatural break in audio, whereas its presence provides continuity and flow. The preferred embodiments therefore splice between current audio segments and subsequent audio segments at an anacrusis immediately before an earliest onset in either the currently active track or the destination track, thereby allowing different audio segments conveying different themes to be matched together. The system therefore operates to pin and document an anacrusis to an appropriate point in an audio segment.

The audio generator 80 preferably includes a buffering function 84 to smooth audio transmissions and minimize delays. As its output 86, the audio generator 80 can either stream 88 the assembled audio segment or send the audio segment to a file 90.

Figure 4:
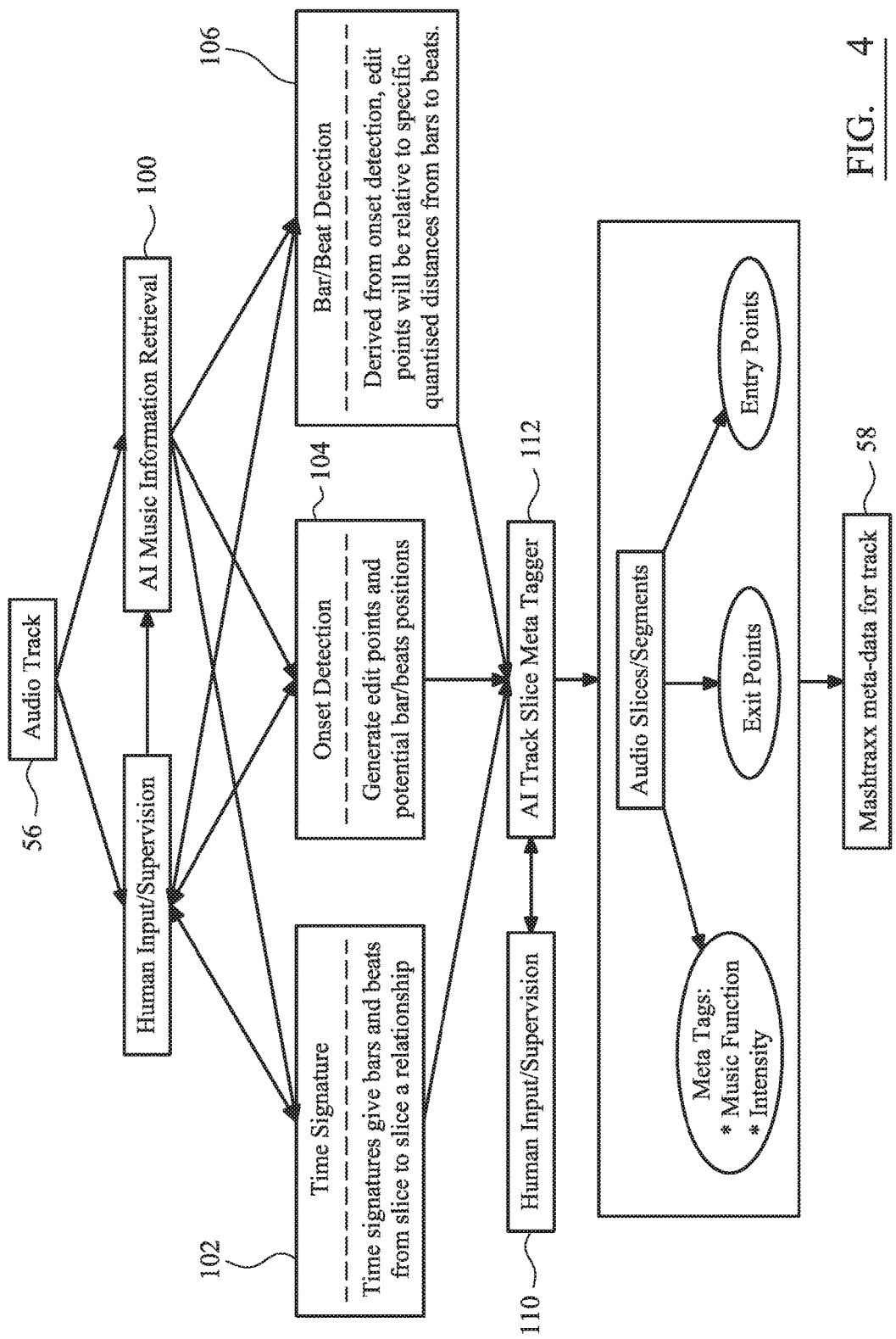
FIG. 4 is a functional diagram for track assembly and metadata creation in accordance with a preferred creation process.

FIG. 4 is a functional diagram for track assembly and metadata creation in accordance with a preferred creation process. FIG. 4 therefore represents the processes applied, for example, to an original musical track 56 to create a composite media file (reference numeral 54 of FIG. 1) containing Mashtraxx metadata for the original musical track 56.

For an audio track uploaded or made available to the system of FIG. 3, the audio track is subjected to AI-based MIR algorithms, as previously indicated. Through a preferred provision of a GUI, human review of the audio track's spectral composition, time signature(s) 102, including tempo, and other significant musical events may be input to define or refine (further) themes and audio segments. This human-based process, whilst merely preferred, can therefore address deficiency or errors associated with automatic interpretation of the audio track's characterization. For example, the start point of a desired signal envelope for an audio segment can be adjusted manually through a GUI so as to align more precisely the start of audio data sampling with the commencement of a particular musical event (and thus an identified theme relevant to the external event that is to be augmented by the process of the present invention).

Analysis of the time signature(s) provides a determination of bars and beats and, furthermore, variation of these as they occur between samples that make up the selected audio sections. This analysis provides the basis for the described mechanism (of the preferred embodiment) for seamless integration of one section to another regardless of differing time signatures and anacrusis.

Additionally, within each audio section, the system is configured to detect 104 onsets at different points. Cutting between source, i.e. an active playing slice, and a destination slice, i.e. the audio segment that has been selected to be the next played in order to change the audio theme, will be described in more detail below and with reference to FIG. 5, whilst FIG. 9 shows a preferred process by which an onset can be determined.

Onset determination explained with respect to FIG. 9 can be implemented independently on other embodiments and aspects as described herein, although its inclusion in the system provides a comprehensive solution. A musical onset is the point in time at which a musical (or other significant audible) event begins.

Figure 9A:
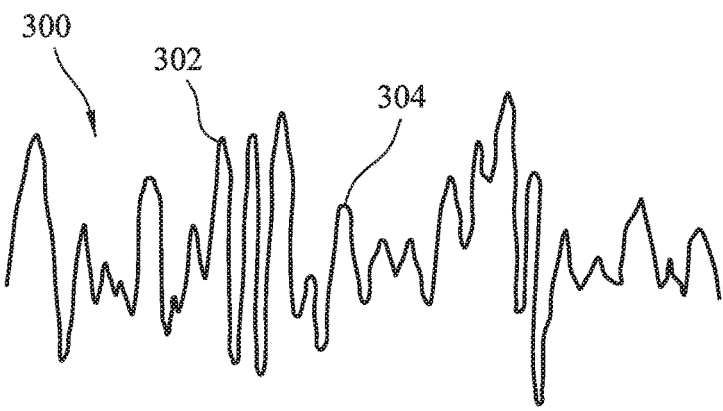
FIG. 9, composed of FIGS. 9a to 9d, shows a preferred process by which an onset is determined, the process employed by the preferred system in undertaking the cross-fade or cut exemplified in FIGS. 6a to 6c.
Figure 9B:
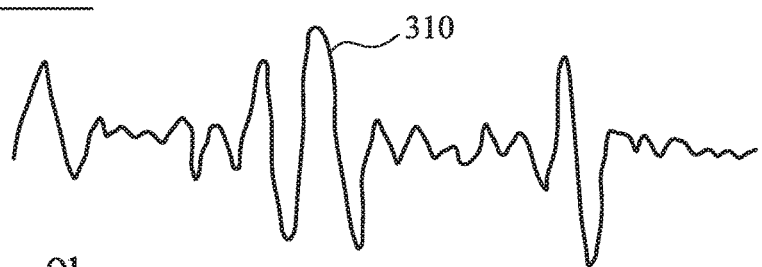
Figure 9C:
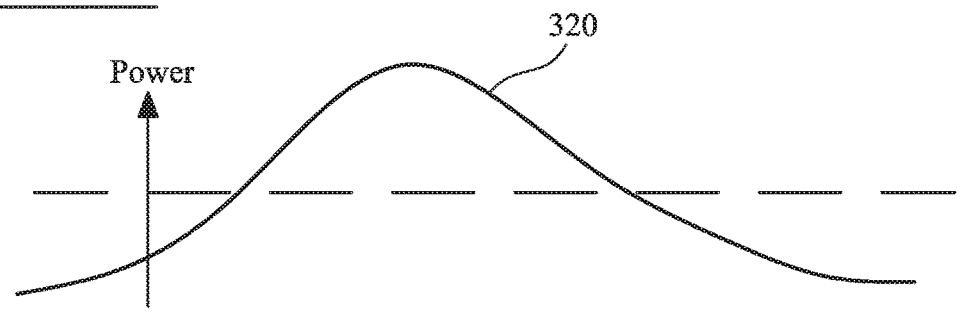

In FIG. 9a, a typical audio signal 300 is shown to comprise components 302, 304 of varying amplitude. For onset detection, a preferred embodiment firstly separates the transient part (i.e. quickly evolving aspects of the audio signal) from the stationary part (i.e. stable aspects of the audio signal) of the audio signal 300; this produces a time domain representation 310 as shown in FIG. 9b. Transients are more usually associated with higher frequencies and where these higher frequencies demonstrate significant increases in energy. An amplitude envelope 320 of the transient part is then determined; this is typically based on a convolution function as will be understood by the skilled addressee in audio signal processing.

Figure 9D:
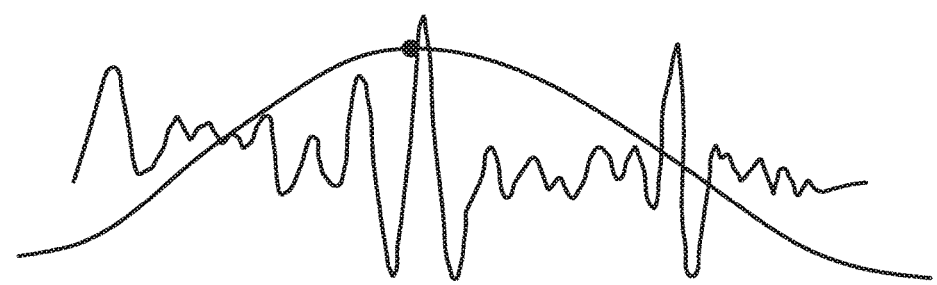
Figure 8:
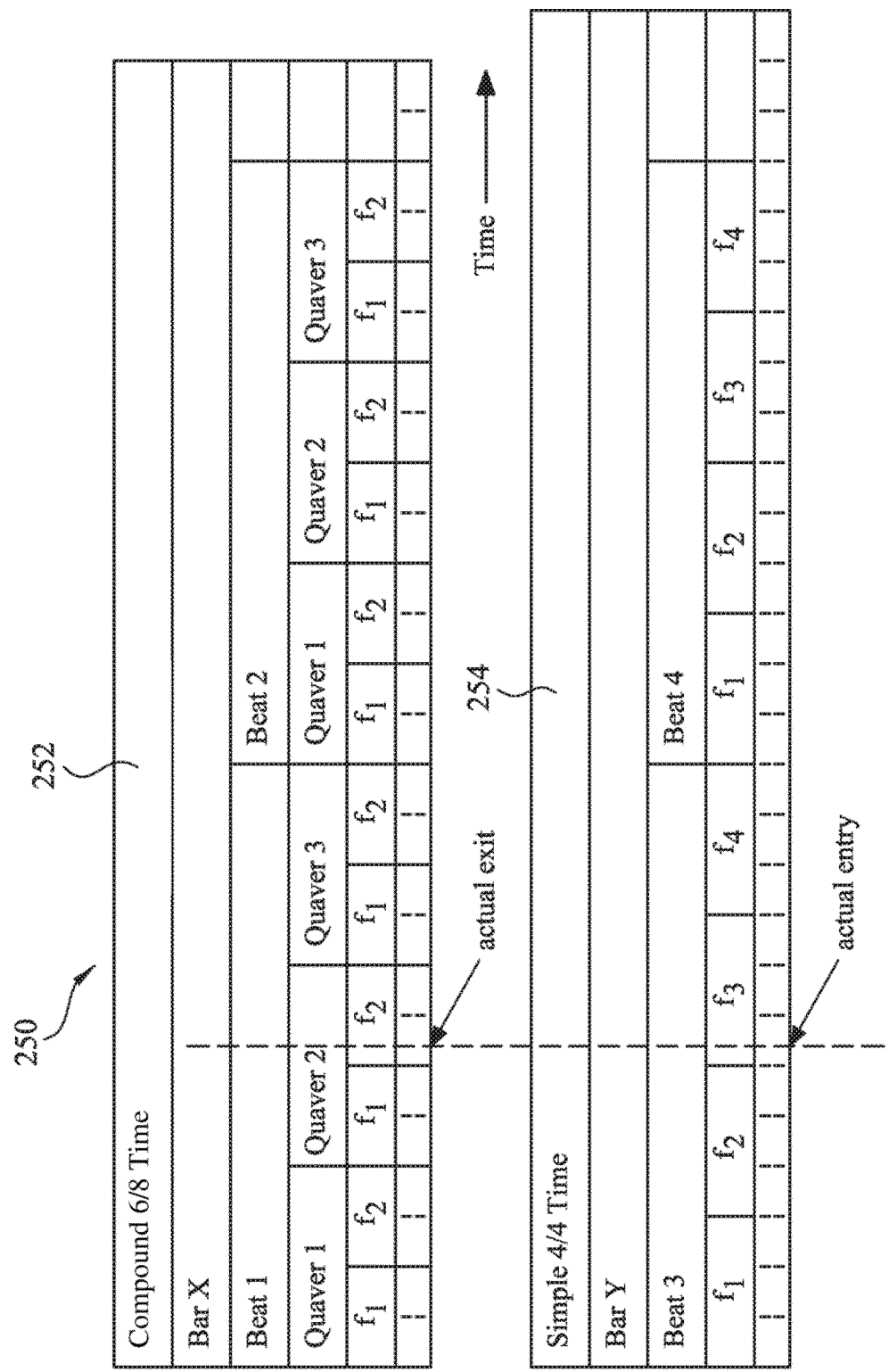

Subsequently, relative to a power threshold 330, peaks in the amplitude envelope 320 are detected. Peaks correspond to maximum points of the envelope in a localised region. Then, to attain the exact position of the onset, the system is configured to work through the transient signal from the peak backwards in time to find the point X at which a characteristic of a period of the signal before that point X is maximally different from that same characteristic of a period of the signal after that point X. Characteristics include, but are not limited to, the standard deviation of the first derivative of the transient signal before and after the point X. In other words, the biggest ratio in adjacent powers as sampled over the entire transient amplitude envelope provides the most appropriate point for the onset; this is illustrated in FIG. 9d. Expressly this differently again, an onset start is detected by preferably looking to identify the point where the standard deviation of the rate of change of an identified characteristic over a period before that sampling point is maximally different for the same characteristic after that point.

Sampling periods may be in the region of about ten milliseconds to about fifty milliseconds. As an example of an onset, a cymbal crash is likely to represent an onset given that it is likely to have a maximum change in transients at the point of its occurrence in the audio signal.

Returning again to FIG. 4 and the process for generating track metadata, further automated track analysis (which again may be reviewed in light of manual input) functions to resolve bar/beat position 106. Given the relationship between level and thus onset, bar and beat detection can be derived from or based on onset detection 104.

With respect to the ongoing signal processing within the system, the time signatures analysis 102, onset detection 104 and bar/beat detection 106 (as well as any supervised input from a user 110) is used to slice or segment the audio track into themes—of varying duration—that correlate to the Mashtrtaxx vocabulary applied to categorize the nature of the external event and thus the nature of audio enhancement. In this respect, a metatagger 112, preferably realized using AI logic—compiles an enhanced audio track 58 that includes metadata tags for selected audio sections. As indicated or inferred, this metadata identifies at least musical function and intensity as well as exit and entry points for cuts and fades for the themes associated with the section. The metadata tagging means that a sampled and delivered audio frame, i.e. a slice or segment, can be made to coincide precisely with timing of an identified external event 12, such as a identified by surpassing of triggering threshold or identification of a theme from an assigned Mashtraxx vocabulary word.

Time signatures or timeline generation allows the track sections to be described in musical notation, which is essential for correct matching of the track sections. Accurate identification of the time signature allows for a moveable timeline that supports automatic snapping to the closest beat.

The system generates a timeline preferably created in beats and bars for a digital audio track, ensuring that a musically faithful notation is preserved for the editing process. It is this that underpins the successful cutting, splicing and remixing of content in such a way that it is not detrimental to the musical integrity of the piece. System intelligence allows the construction of a flexible approach that can adapt according to the audio input that is to be modified. For example, if a decrease in tempo is detected then the timeline can be adjusted accordingly. This is important in the deconstruction of musical forms for the purpose of remixing and re-editing. It supports a tangible understanding of how the audio relates musically to the timeline and allows the user to maintain a real sense of musical structure within a digital format.

Audio section creation is therefore the process of dividing up a track into sections which can be rearranged to form a new composition. Preferably, sections are automatically snapped to bars. Each section can belong to a group that may be user definable, but preferably default to one of an intro, a verse, bridge, chorus, Middle 8 or outro (as identified by the metatag). Each section allows customisable metadata properties, including but not limited to intensity, musical function, instruments, vocals and tags.

The system of the present invention makes use of software to maintain traditional compositional rhythmic analysis in terms of bars, beats and fractions of bars. This allows the user to engage in splitting and understanding bar and beat compositions in a traditional fashion. This will maintain the compositional intuition, making the deconstruction and rearrangement of ideas musically straightforward. The system also incorporates pulse data, exploiting the full potential of digital audio, enabling the smallest compositional fraction to be split into further pulses. The main function of the pulses is to offer the smallest granularity necessary to cope with different time signatures and coefficients used to cut between different time signatures in different sections.

In accordance with the present invention, metadata for a complete track therefore contains a set of audio section descriptions as well as an explanation as to how they can be transitioned to or from any other section. Each audio section therefore includes comprehensive metadata allowing a slice sequence to be constructed given a user brief correlating to a characterization of an external event. Optionally, the metadata may contain a reference to the original audio track, enabling the correct track to be located from an online music library, such as Spotify. This allows the metadata to be stored independently of the original track and for both the metadata and track to be streamed or pulled down by the section assembly intelligence 52.

The metadata framework therefore allows for tagging of music according to certain user-defined categories. For example, these categories could include; for example, genre, mood, style and tempo and could be used to create a database of sound that is searchable. In effect, the system yields the potential to search for music not only by title and artist, but by sound, genre and musical style. The database configuration of FIG. 10 therefore allows for searching of individual sections' metatags, and not just on a global approach to handing of metadata. For example, it is preferred that the meta tagging system can fulfil briefing requirements such as: "I'd like a track which is upbeat, happy lively, also it needs to have a trumpet solo at some point, and a chill out section with string beds somewhere else." Existing systems fail to provide such a richness and flexibility of searching.

Preferably, metadata schema not only allows data to be attributed to the whole track, but facilitates fine grained annotation of particular sections, thereby providing descriptive data of salient features of a piece of music. One or more (and typically multiple) applied musical characterizations are common to each piece of music, and therefore allow the AI mechanism to edit a digital audio file depending on synchronization requirements with identified incoming events (from the real world). The emotional metatags of the audio are therefore independent of characterizations applied to the theme of each section. Searching for different emotional moods will allow for different audio sections to be swapped out to fulfil synchronization requirements. Some key features therefore include musical hit points and function descriptors relating to:

Climax: Where the music hits a peak
Static section: the music neither increases nor decreases in perceived contextual and or actual level intensity
Drama drop out: the music changes suddenly to become very sparse
Drop down fade: the music gradually decreases in intensity
Build: the music gradually increases in intensity
Underscore: low level audio fill under dialogue and acting
Genre
Instrument type Every section of a piece of music can be described in terms of its form function, i.e. how the section operates within the totality of the piece, e.g. underscore, drop-out fade and build. Therefore, irrespective of the emotionally-related contextual metatags applied to a section, if the incoming event data can be described in terms of the described musical form functions then any piece of music can be used and will fulfil the synchronization requirements regardless of any emotional subjectively that arises with characterization of a particular piece by user. This is significant to the functionality of the described processing applied in the various embodiments of the invention.

Metatagging does not need to be limited to music, and could apply to other sound sources (such as the kicking of a football) so a sound stage can be augmented by an inserted audio section that is tagged to an identified external event.

Figure 5:
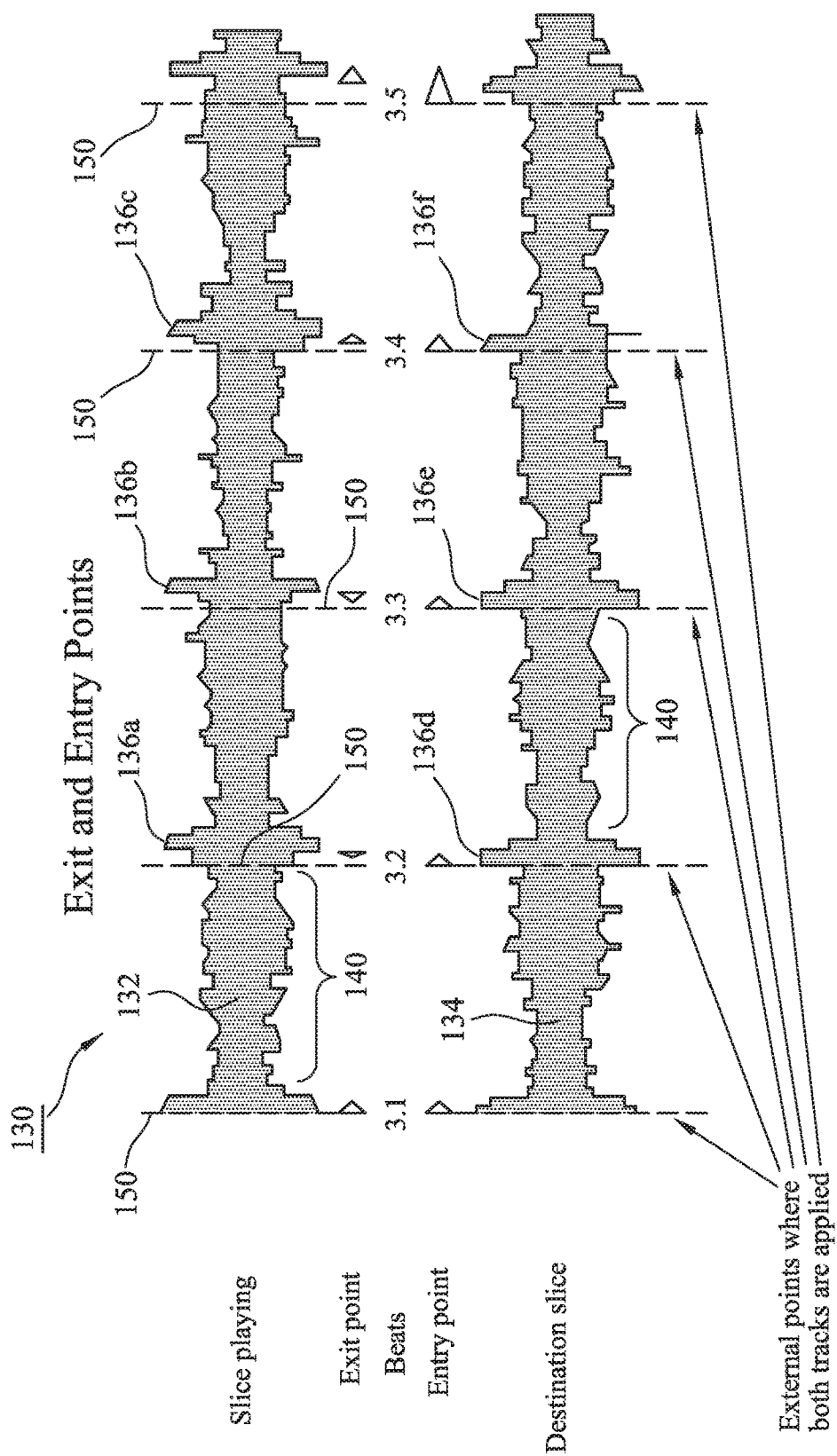
FIG. 5 is time domain representation of a preferred cut strategy between an exit point from and entry point to different musical themes within sections of audio.

FIG. 5 is time domain representation 130 of a preferred cut strategy between an exit point from and entry point to different musical themes within track samples.

Within FIG. 5 there are two time domain spectral: a first active "playing" audio segment 132 and a second "destination" audio segment 134 that is used to introduce a change in theme and second segment which is to be cut into, i.e. to replace, the first active segment as a new correlated audio output. The preferred embodiment accomplishes this fade/cut in a near seamless fashion.

Both time domain spectra include common features, such as onsets 136a-136f.

In terms of a time signature or time base 150, this is represented in the diagram of vertical dotted lines that partition the audio envelope into segments that may have a duration corresponding to a semiquaver, crochet of or some other selected timing. In FIG. 5, an exemplary representation provides for four fractions of a beat 3.1, 3.2, 3.3 and 3.4 that divide the relevant portion of each envelope into four equal time sectors. These four fractions may, in fact, represent a musical beat or multiple beats or some other period in the audio track.

Figure 6A:
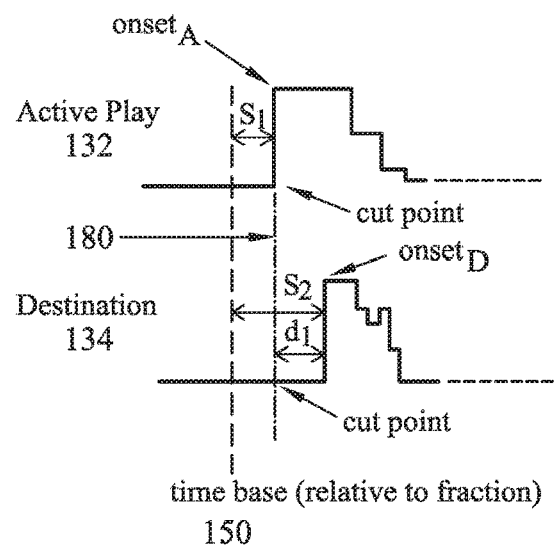
FIGS. 6a, 6b and 6c show a cross-fade or cut between active and destination audio sections relative to both a common time base and respective onset events, the cross-fade or cut in accordance with a preferred embodiment.
Figure 6B:
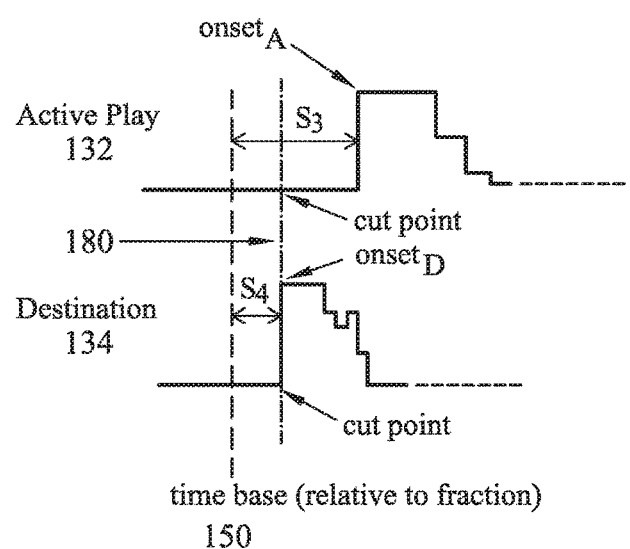
Figure 6C:
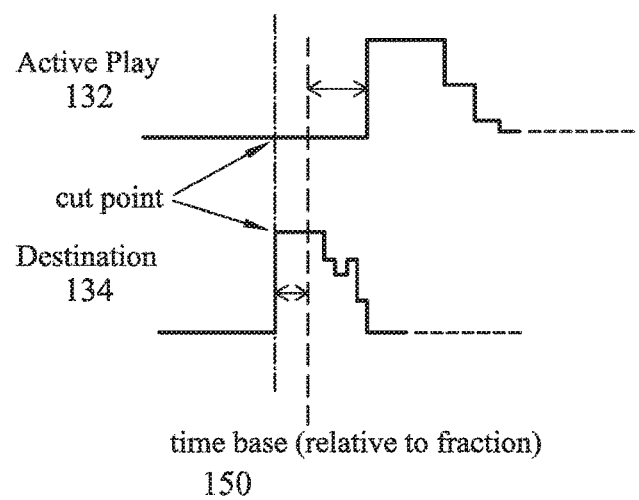

Referring to FIGS. 6a, 6b and 6c, in terms of the exit from the first active playing audio segment 132 to the second destination audio segment 134, the preferred fade/cut process firstly identifies and then contrasts the relative onsets in the first active playing audio segment $onset_A$ and second destination audio segment $onset_D$, with the assessment made relative to the nearest appropriate time base 150. Having two onsets $onset_A$ and $onset_D$ played in close time proximity or an expected onset delayed significantly in time would cause a noticeable discontinuity in the fluidity of the audio and the transition between themes.

Consequently, when a theme transition is to take place, a preferred embodiment looks to the sampling time differences ($s_1$ relative to $s_2$ and $s_3$ relative to $s_4$) between the first onset (in each of the active and destination segments) and selects the earliest of the alternatives. Regardless of whether the onset occurs in the active playing track or the destination track, the earliest onset in time relative to the time base 150 is the point when there's a cross fade—and preferably an instantaneous cut 180—from the active playing section to the destination section. For cross-fading, a typical cross-fade may take up to about five milliseconds. Cross-fading is preferred to an instantaneous cut since it avoids the potential for an audio pop as the voltage in the two signals is unlikely to match. Unless a specific context requires a more limited interpretation, the term "cut" should be viewed as a special case cross-fading event that occurs more rapidly.

In FIG. 6a, the cut 180 from the active audio section 132 to the destination section 134 is therefore triggered simultaneously with (or, if buffering is available, marginally before) the sample where the onset in the active audio section 132 starts to rise. Destination audio track is then played out and becomes the active track until such time as another theme change is required. In FIG. 6b, the cut 180 from the active audio section 132 to the destination section 134 is therefore triggered simultaneously with (or, if buffering is available, marginally before) the sample where the onset in the destination audio section 132 starts to rise. Typically, sampling rates and time bases operate on fractions of a second, so an absolute cut (rather than a slower fade) is inconsequential and not substantially noticeable. The process therefore allows for the seamless and endless reconstruction of a piece of audio. Buffering is preferred since it provides for pre-processing.

In FIG. 6c, it is noted that the onset in the destination audio 134 occurs before the time base 150, whereas in the active play section the onset is detected as occurring after the time base. In FIG. 6c, cut and cross-fade is therefore timed with the detected onset in the destination section 134, with buffering ensuring that its timing is maintained.

By separating the metadata from the original track and storing the metadata in a secure database, the system of the preferred embodiment optionally keeps the substance of the content invisible, thus protecting licencing and copyright issues. The separation process may therefore eliminate much of the access needed for P2P (Peer-to □Peer) sharing, since the content may be dynamically generated each time it is required. In fact, the system of the preferred embodiment may protect the original content, as well as the new content generated by user input and the syncing process.

The system and processes of the present invention therefore supports creative editing through an automated process operable in real-time. As such, music for games can be dynamically edited to follow the story of the game: the highs and lows, achievements and failures. Since an in-game experience invariably varies, this means that intelligent framework 52 (of FIG. 2) can operate to stream music validated to an access key for each track to eliminate piracy for those users who do not possess a valid access key. Additionally, the use of metatagging of audio and correlation with real-world events permits a user to make use of their favourite music over, for example, a personal YouTube, Facebook and Vimeo video.

In summary, the present innovation provides a method for editing digital audio information with music-like composition characteristics that enable real-time music synchronization. The system provides for onset detection as well as the identification of an anacrusis event in both an exit and entry audio section that provides for a seamless audible transition. This sophisticated system uses DSP and speciality AI algorithms to analyse raw audio data and perform editorial manipulations that previously have demanded expert knowledge and trained music professionals to execute. Furthermore this adaptive system segments audio data, whilst simultaneously seeking to imbue a set of control codes that are easily adjusted to allow editorial change. The present invention serves to transform the musically significant parameters of digital audio information. While the waveform has become the standard representation and navigation interface for digital editing, it neglects traditional compositional rhythmic analysis in terms of bars and beats. This information is essential for the rearrangement and remixing of audio tracks, and is integral to automated synchronization. Furthermore, this system supports the encoding of additional descriptive metadata in the file format relating to the textures, trajectories and intensity of a given piece of music. There is currently no existing metadata format for capturing the narrative functions of a piece of music, and this will provide a structured way for doing this and a system for converting this high level information into a low level transferable data format.

From the perspective of end-user functionality, the software is configured to allow end-users to provide descriptive data that will facilitate the automatic retrieval of a selection of tracks that are automatically remixed—by the section assembly intelligence 52—to fit to the scenario that requires musical accompaniment. End-users can provide guidance through the described access interfaces, which guidance can be based on the mood they want to create and even suggest a narrative they want the music to achieve. The system is preferably configured to reduce the information overload by retrieving only items that are estimated as relevant for the user, based on a simplistic input from the user, such as basic annotation of a piece of film data or information about the desired usage of the music. The system is configured to select relevant tracks based on global and intra-track specifications decided by an analyst or annotator, such as input and correlated to the external event through natural language or a Mashtraxx vocabulary word. Examples of this would be mood, general pace/speed of the music, key instruments (if they have any in mind) and genre.

Unless specific arrangements are mutually exclusive with one another, the various embodiments described herein can be combined to enhance system functionality and/or to produce complementary functions in the effective delivery of sensory-relevant synchronized audio. Such combinations will be readily appreciated by the skilled addressee given the totality of the foregoing description. Likewise, aspects of the preferred embodiments may be implemented in standalone arrangements where more limited functional arrangements are appropriate. Indeed, it will be understood that unless features in the particular preferred embodiments are expressly identified as incompatible with one another or the surrounding context implies that they are mutually exclusive and not readily combinable in a complementary and/or supportive sense, the totality of this disclosure contemplates and envisions that specific features of those complementary embodiments can be selectively combined to provide one or more comprehensive, but slightly different, technical solutions.

The present invention may be provided in a downloadable form or otherwise on a computer readable medium, such as a CD ROM, that contains program code that, when instantiated, executes the link embedding functionality at a webserver or the like. It will, of course, be appreciated that the above description has been given by way of example only and that modifications in detail may be made within the scope of the present invention. For example, whilst the preferred embodiment has been described in the context of both an exercise environment, the technology is also applicable to augmenting sounds, such as the identified sound profiles associated with striking a tennis ball. The system of the present invention can therefore be arranged to augment the environmental experience with live sports matches by substituting an audio sample into the sound mix at the point when the tennis ball is identified as being struck.

The method and system of identifying onsets, as especially described with respect to FIGS. 9a to 9d, may in fact find further and more applications beyond the synchronization of audio data to augment monitored events. The method and system may therefore be more generally applied to identifying onsets in any music or audio content file irrespective of whether or not the music is categorised in terms of a contextual theme (whether automatically sensed or set through a user or expert critique).

Although the preferred embodiments discuss the adaptation of audio to external events, the reverse holds true in that external events can be triggered or shaped by the audio metadata. For example, an external event may be a video transition occurring between contiguous scenes in a film or a new phase within a level of a computer game (such as when new characters arrive or when new abilities are acquired and first presented to the game player during game play). Based on an understanding of (for example) one or more of intensities, sections, bars, beats and fractions of a beat determined in the context of the preferred embodiments, the audio metadata derived from the various preferred embodiments can be used to drive a change in the observed temporal property of the events as experienced, e.g. lights flashing or props moving within a live stage performance or within a CGI environment or a recorded video.

The invention claimed is:

1. An auditory augmentation system comprising:
   a database containing a multiplicity of audio sections and associated metadata for digital audio files, each audio section mapped to at least one contextual theme defined with respect to identified musical timings, each contextual theme itself mapped to an audio section having at least one entry point and at least one exit point, said entry and exit points supporting seamless splice or fade transitions between different audio sections and wherein each of said at least one entry point and said at least one exit point relates to an anacrusis event for the section as expressed in terms of beats and fractions;
   a processing system coupled to the database and responsive to said metadata; and
   an input coupled to the processing system, the input in the form of temporally-varying events data that defines a temporal input;
   wherein the processing system is arranged:
      to resolve the temporal input into one or more of a plurality of categorized contextual themes;
      to correlate said categorized contextual themes with metadata associated with selected audio sections relevant to the one or more of the plurality of categorized contextual themes, and thereafter
      to splice or fade together selected audio sections to reflect said events as the temporal input varies, thereby to generate, as an output, a media product in which transitions between audio sections are seamless and the audio sections are aligned with the temporally-varying events.

2. The auditory augmentation system according to claim 1, wherein the processing system selects the audio track substantially in real-time to accompany changing physical or local environmental events.

3. The auditory augmentation system according to claim 1, wherein the system is arranged to augment an overall sensory experience of a user in the real world by dynamically changing, re-ordering or repeating and then playing audio sections within the context of said categorized themes associated with the changing nature of events presented as the temporal input to the processing system.

4. The auditory augmentation system according to claim 1, wherein the processing system is a distributed set of processing systems.

5. The auditory augmentation system according to claim 1, wherein said entry and exit points support seamless rhythmic transition in audio output between audio sections and wherein the spice or fade preserves integrity of musical timing between audio sections.

6. The auditory augmentation system according to claim 1, wherein said musical timings take the form of one of:
   a beginning and an end in the case of a sustained feature for the contextual theme, wherein the sustained features is one of a form function and a hit point over time; and
   a specific point in time for a hit point.

7. The auditory augmentation system according to claim 6, wherein the form function is selected from one of the group consisting of:
   a static section;
   a drop-out;
   a fade in intensity;
   a build in intensity;

a relative intensity of the audio section; and
an underscore.

8. The auditory augmentation system according to claim 6, wherein the hit point over time is selected from one of the group consisting of:
   a sound effect;
   speech;
   riff; and
   instrument type.

9. The auditory augmentation system according to claim 1, wherein the temporal input takes the form of an intensity arising from at least one of:
   a relative change in light levels;
   a relative change in sound levels;
   changing rates in a monitorable function; and
   a relative change of audio characteristics between a current audio section and a new audio section that is to be cut or spliced into the current audio section.

10. The auditory augmentation system according to claim 1, wherein the temporal input takes the form of a scaling of intensities arising from at least one of:
   a relative change in light levels;
   a relative change in sound levels;
   changing rates in a monitorable function; and
   a relative change of audio characteristics between a current audio section and a new audio section that is to be cut or spliced into the current audio section.

11. The auditory augmentation system according to claim 1, wherein said musical timings take the form of one of:
   (i) a beginning and an end in the case of a sustained feature for the contextual theme, wherein the sustained features is one of a form function and a hit point over time; and
   (ii) a specific point in time for a hit point.

12. An auditory augmentation system comprising:
   a database containing a multiplicity of audio sections for digital audio files, each audio section mapped to a contextual theme defined with respect to identifying musical timing for the audio section, each theme itself mapped to at least one entry point and at least one exit point, said entry and exit points supporting a seamless fade transition between different audio sections and wherein each of said at least one entry point and said at least one exit point relates to an anacrusis event for the section as expressed in terms of beats and fractions;
   a processing system coupled to the database and responsive to said metadata; and
   an input coupled to the processing system, the input identifying a changing nature of events presented as a temporal input to the processing system, each event categorized with a theme;
   wherein the processing system is arranged to correlate the categorized themes of said changing events with said contextual themes for audio sections and is further arranged automatically to select and splice together audio sections to reflect said events as the temporal input varies.

13. A method of aligning audio sections in one or more digital audio tracks with temporally-varying events data to compose a media product, the method comprising:
   receiving, as temporal input, a stream of data containing temporally-changing events data;
   accessing a database containing a multiplicity of audio sections and associated metadata for digital audio files, each audio section mapped to at least one contextual theme defined with respect to identified musical timings, each contextual theme itself mapped to an audio section having at least one entry point and at least one exit point, said entry and exit points supporting seamless splice or fade transitions between different audio sections and wherein each of said at least one entry point and said at least one exit point relates to an anacrusis event for the section as expressed in terms of beats and fractions and wherein said musical timings take the form of one of: (i) a beginning and an end in the case of a sustained feature for the contextual theme, wherein the sustained features is one of a form function and a hit point over time; and (ii) a specific point in time for a hit point;
   resolving the temporal input into one of a plurality of relevant categorized contextual themes;
   correlating said categorized contextual themes with metadata associated with selected audio sections relevant to the one or more of the plurality of categorized contextual themes; and
   splicing or fading together selected audio sections from one or more selected digital audio files of the database to reflect said events as the temporal input varies, thereby generating, as an output, a media product in which transitions between audio sections are seamless and the audio sections are aligned with the temporally-changing events.

14. The method of claim 13, wherein the audio track is selected to accompany changing physical or local environmental events.

15. The method of claim 13, wherein the method augments an overall sensory experience of a user in the real world by dynamically changing, re-ordering or repeating and then playing audio sections within the context of said categorized themes associated with the changing nature of events presented as the temporal input to the processing system.

16. A method of aligning audio sections in one or more digital audio tracks with temporally-varying events data to compose a media product, the method comprising:
   receiving, as temporal input, a stream of data containing temporally-changing events data;
   accessing a database containing a multiplicity of audio sections and associated metadata for digital audio files, each audio section mapped to at least one contextual theme defined with respect to identified musical timings, each contextual theme itself mapped to an audio section having at least one entry point and at least one exit point, said entry and exit points supporting seamless splice or fade transitions between different audio sections and wherein each of said at least one entry point and said at least one exit point relates to an anacrusis event for the section as expressed in terms of beats and fractions and wherein said musical timings take the form of one of: (i) a beginning and an end in the case of a sustained feature for the contextual theme, wherein the sustained features is one of a form function and a hit point over time; and (ii) a specific point in time for a hit point;
   selecting at least one relevant contextual theme from a plurality of contextual themes;
   correlating said at least one selected relevant contextual theme with metadata associated with selected audio sections relevant to the one or more of the plurality of categorized contextual themes; and
   splicing or fading together selected audio sections from one or more selected digital audio files of the database to reflect said events as the temporal input varies, thereby generating, as an output, a media product in which transitions between audio sections are seamless and the audio sections are aligned with the temporally-changing events.

17. The method of claim 16, wherein the audio track is selected to accompany changing physical or local environmental events.

18. The method of claim 16, wherein the method augments an overall sensory experience of a user in the real world by dynamically changing, re-ordering or repeating and then playing audio sections within the context of said categorized themes associated with the changing nature of events presented as the temporal input to the processing system.

* * * * *

UNITED STATES PATENT AND TRADEMARK OFFICE
CERTIFICATE OF CORRECTION

| | | |
|---|---|---|
| PATENT NO. | : 10,467,999 B2 | |
| APPLICATION NO. | : 16/035234 | |
| DATED | : November 5, 2019 | |
| INVENTOR(S) | : Joseph Michael William Lyske | |

It is certified that error appears in the above-identified patent and that said Letters Patent is hereby corrected as shown below:

In the Drawings

1. Replace the drawing sheet for Figure 8 with the attached replacement sheet.

2. Replace the drawing sheet for Figure 10 with the attached replacement sheet.

In the Specification

1. Column 2, Line 42 after Barcelona, insert -- [2004] --.

2. Column 15, Line 22 after relationship, insert -- . --.

3. Column 22, Line 12 change "(Peer-to☐Peer)" to -- (Peer-to-Peer). --.

4. Column 19, Line 6 change "Mashtrtaxx" to -- Mashtraxx --.

5. Column 20, Line 43 change "and or" to -- and/or --.

Signed and Sealed this
Fifteenth Day of December, 2020

Andrei Iancu
*Director of the United States Patent and Trademark Office*

| Track | Section | Description | Time Position | Entry Pt | Exit Pt |
|---|---|---|---|---|---|
| | | Database | | | |
| 1 | 001 | Chorus | 0.15 - 0.36 | | |
| | 010 | VERSE | 0.36 - 0.59 | | |
| | 011 | Intro | 0.00 - 0.15 | | |
| 2 | 001 | Chorus | 1.05 - 1.20 | | |
| | 010 | VERSE | 1.30 - 1.48 | | |
| | 011 | Intro | 0.00 - 0.10 | | |
| | 001 | Chorus | 2.05 - 2.20 | | |
| | 011 | xxx | 3.19 - 3.49 | | |
| | 101 | OUTRO | 4.06 - 4.21 | | |
| N | | Theme category 204 | Section Timing | Exit/Entry points Anacrusis Displacement (Beat + Fraction) relative to start/end of audio section | |

FIG. 10